United States Patent [19]

Vanek et al.

[11] Patent Number: 5,446,362
[45] Date of Patent: Aug. 29, 1995

[54] THERMAL PROTECTION FOR AC TRACTION MOTORS USING TEMPERATURE ESTIMATIONS TO CALCULATE TORQUE LIMITS AND BLOWER SPEED REQUIREMENTS

[75] Inventors: Laurence D. Vanek, Ballston Spa, N.Y.; Robert G. McGrath, North East; Michael H. Lafferty, Harborcreek, both of Pa.

[73] Assignee: General Electric Company, Erie, Pa.

[21] Appl. No.: 263,100

[22] Filed: Jun. 21, 1994

[51] Int. Cl.6 ............................................. H02P 7/00
[52] U.S. Cl. ................................. 318/801; 318/432
[58] Field of Search ........................ 318/799–801, 318/434, 254, 439, 138, 471, 481, 432, 802–815; 361/23, 24, 25, 31, 103; 120/175, 176

[56] References Cited

U.S. PATENT DOCUMENTS

| | | | |
|---|---|---|---|
| 4,045,973 | 9/1977 | Anderson et al. | 62/158 |
| 4,052,647 | 10/1977 | Thompson | 318/139 |
| 4,282,466 | 8/1981 | Matty | 318/434 |
| 4,307,775 | 12/1981 | Saunders et al. | 165/11 R |
| 4,628,397 | 12/1986 | Gareis et al. | 361/103 X |
| 4,638,233 | 1/1987 | Erdman | 318/439 X |
| 5,019,757 | 5/1991 | Beifus | 318/254 |
| 5,206,810 | 4/1993 | Bools et al. | 318/564 |
| 5,303,560 | 4/1994 | Hanson et al. | 361/22 X |

OTHER PUBLICATIONS

"Multiple Regression Analysis" by M. A. Efroymson, Esso Research & Engineering Company Mathematical Methods for Digital Computers, Wiley and Sons, Inc. (New York: John, 1960) pp. 191–203.

"Protective Relaying for Large AC Motors" by C. R. Olson, et al, IEEE Ind. Appl. Soc Annual Meeting Conf. Record, Oct. 7–10, 1974, pp. 15–21.

"Survey of Induction Motor Protection", AIEE Committee Report, AIEE Transactions, Jun. 1960, pp. 188–192.

"Thermal Tracking-A Rational Approach to Motor Protection", by David R. Boothman, et al, IEEE Transactions on Power Apparatus and Systems, vol. PAS 93 (Sep./Oct. 1974), pp., 1335–1344.

Primary Examiner—Jonathan Wysocki
Attorney, Agent, or Firm—Ann Marie Kratz; Marvin Snyder

[57] ABSTRACT

A thermal protection apparatus for an AC traction motor including a stator, a rotor, a blower fan, and an inverter includes measuring apparatus for measuring ambient air temperature of the motor and atmospheric air pressure of the motor. A computer is provided for using the measured ambient air temperature and atmospheric air pressure values for estimating a plurality of temperatures in the AC traction motor and for calculating a plurality of motor torque limits imposed by the plurality of estimated temperatures. A control system is provided for controlling the inverter by providing a signal comprising the lowest of the calculated plurality of motor torque limits to an inverter controller. The control system can also be used to calculate a plurality of blower speed requirements imposed by the plurality of estimated temperatures and set the blower speed of the motor to the highest of the calculated plurality of blower speed requirements.

13 Claims, 17 Drawing Sheets

Fig. 2A

```
      SUB MTP13 (TQFB, VL1, SLIPRPM, TAMB, SFBTM, PWM, DIESELSPD, BSPEED, PAMB, IPHPK, IFIRST, RUNINV)
5614'
5616' DATA SUPPLIED TO MTP13
5617'
5618'  TQFB       :   MOTOR AIR GAP TORQUE (FROM INVERTER CONTROL CALCULATIONS) (lbf-ft)
5620'  VL1        :   DC LINK VOLTAGE (Vdc)
5622'  SLIPRPM    :   ROTOR SLIP SPEED (rpm)
5624'  TAMB       :   AMBIENT TEMPERATURE (deg. C)
5626'  SFBTM      :   TRACTION MOTOR SPEED FEEDBACK (rpm) - Supplied as unsigned (always positive)
5628'  PWM        :   SQ. WAVE / PWM BOOLEAN (PWM=1 implies PWM mode)
5630'  DIESELSPD  :   ENGINE SPEED (rpm)
5632'  BSPEED     :   EQUIPMENT BLOWER SPEED STATUS (0 = STOP, .5 = HALF, 1.0 = FULL)
5634'  PAMB       :   ATMOSPHERIC PRESSURE (psi)
5636'  IPHPK      :   PEAK VALUE OF FUNDAMENTAL PHASE CURRENT (A-peak)
5637'  RUNINV     :   INVERTER STATUS BOOLEAN (RUNINV=1 implies inverter powered up, =0 implies inverter powered down)
5638'
5641'
5642' OUTPUT VARIABLES TO LOCOMOTIVE SYSTEM
5643'
5644'  ATEMPS     :   AVERAGE STATOR TEMPERATURE (C)
5646'  ATEMPR     :   AVERAGE ROTOR CAGE TEMPERATURE (C)
5648'  EBSPCM     :   EQUIPMENT BLOWER SPEED COMMAND (0 = STOP, .5 = HALF, 1.0 = FULL)
5649'  TQLIM      :   MOTOR TORQUE LIMIT (lbf-ft)
       R1AVE      :   STATOR WDG. RESISTANCE/PHASE - (Ohm) @ "ATEMPS" TEMPERATURE
       R2AVE      :   ROTOR CAGE RESISTANCE/PHASE - (Ohm) @ "ATEMPR" TEMPERATURE
5650'
5651' PARAMETERS
5652'
5654'  AEND  = 2473.03         CPAIR = 457.66          C2S   = 4.1622E+04       GINS   = 6.3944E+02       HTOZER = 120.0        MLC    = 37.74
5656'  AENDR = 320.01          COREPU = .50            C3S   = 1.5719E+04       GINSE  = 2.6777E+02       HTOZS  = 90.0         OFFSET = 13.491
5658'  ALPHA = .00426          CSET1 = .00039          C4S   = 8.8255E+04       G12R   = 2.2984E+01       KEDDY  = 1.2527E-05   PIE    = 3.14159
5660'  AROT  = 2532.92         CSET2 = 0.0             C5S   = 2.2543E+05       G23R   = 2.2984E+01       KHBAR  = 3.3622       POLES  = 6.0
5662'  AROTX = .13             CSET3 = .00039          DT    = 6.0              G24R   = 4.7717E+02       KHER   = .3355        RHOB   = .08074
5664'  ASTA  = 4940.06         CSET4 = 0.0             EBCONST = 2.9762         G12S   = 2.2634E+01       KHS    = 6.1804       R10    = .00660
5666'  ASTAX = .32             CSLL  = 3.9910E-08      ERTHK = 1.10             G23S   = 2.2634E+01       K1TQ   = 1.1848E+05   R2BAR  = .0064
5668'  BAREXT = 1.0            C1CFM = .6710           FREQB = 21.0             G45S   = 4.2316E+02       K1TQB  = 3.8478E+04   R2ER   = .0013
5670'  CER1 = 5.3000E-04       C2CFM = .2560           FTOHBAR = 40.00          HDIA   = .813             K1TQER = 1.0848E+05   SK     = 2.296
5672'  CER2 = 4.2000E-04       C1R   = 7.0086E+03      FTOHER = 140.00          HDIAR  = .625             K2TQ   = 5.0000E+02   SLLPU  = .50
5673'  CER3 = 0.0              C2R   = 1.2716E+05      FTOHS  = 150.00          HTOFBAR = 50.0            K2TQB  = 5.0000E+02   TINIT  = 40.0
5674'  CER4 = 0.0              C3R   = 7.0086E+03      FWCOEF = .5207           HTOFER = 150.0            K2TQER = 5.0000E+02   VDROP  = 10
5678'  CL1  = .060             C4R   = 2.5122E+05      GC3   = 1.0149E+03       HTOFS  = 170.0            LCORE  = 21.50        ZTOHBAR = 30.0
5679'  CL2  = .187             C1S   = 1.5719E+04      GCR3  = 7.5839E+02       HTOZBAR = 20.0            LEND   = 8.12         ZTOHER = 130.0
5780'                                                                                                                          ZTOHS  = 110.0
```

```
5781 'INITIALIZATION
5782 '
5784    IPH = IPHPK / SQR(2):        ' FUNDAMENTAL PHASE CURRENT - RMS VALUE
5785
5790    IF IFIRST > .5 THEN
5791       T1SP = TINIT:    ' INITIAL CONDITIONS
5792       T2SP = TINIT
5793       T3SP = TINIT
5794       T4SP = TINIT
5795       T5SP = TINIT
5796       T6SP = TINIT
5797       T1RP = TINIT
5798       T2RP = TINIT
5799       T3RP = TINIT
5800       T4RP = TINIT
5801       T5RP = TINIT
5803       IFIRST = 0
5804    ELSE
5806       T1SP = T1S
5808       T2SP = T2S
5810       T3SP = T3S
5812       T4SP = T4S
5814       T5SP = T5S
5816       T6SP = T6S
5818       T1RP = T1R
5820       T2RP = T2R
5822       T3RP = T3R
5824       T4RP = T4R
5826       T5RP = T5R
5828    END IF

5840 '
5841 'CALCULATE LOSSES
5902 '
5904    IF RUNINV < 1 THEN
5905       CLOSS = 0
5906       W2 = 0
5907       FW = 0
5908       IPH = 0
5909       LLOSS = 0
5910       WNS1 = 0
5911       WNS2 = 0
5912       WNS3 = 0
5913       WNBAR = 0
5914       WNER1 = 0
5915       WNER2 = 0
5916       SFBTM = .1
5917    ELSE
5918       IF SFBTM < .1 THEN SFBTM = .1:    ' AVOID ZERO DIVIDES @ ZERO RPM
5919       RPMS = SLIPRPM + SFBTM
           IF RPMS < 2 THEN RPMS = 2:        ' AVOID ZERO DIVIDE @ ZERO "RPMS"
           SLIP = 1 - SFBTM / RPMS
```

*Fig. 2B*

```
5920        FREQ = RPMS * POLES / 120:              'SYNCHRONOUS SPEED - (rpm)
5922'
5923'   CALCULATE INVERTER TIME HARMONIC LOSSES
5924'
5925        IF PWM > 0 THEN
5926          VPH = (FREQ / FREQB) * (VL1 - SGN(TQFB) * VDROP - PIE * OFFSET / SQR(2)) * SQR(2) / PIE + OFFSET
5927          WNS1 = 0
5928          WNS2 = 0
5929          WNS3 = 0
5930          WNBAR = 0
5931          WNER1 = 0
5932          WNER2 = 0
15933       ELSE
5934          VPH = (VL1 - SGN(TQFB) * VDROP - PIE * OFFSET / SQR(2)) * SQR(2) / PIE + OFFSET
5935          WNS1 = KHS * (VPH / FREQ) ^ 2 * (1 + ALPHA * T1SP) * (LEND / MLC):         'STA. WDG. HARM. LOSS (W) @ OP TEMP
5936          WNS2 = KHS * (VPH / FREQ) ^ 2 * (1 + ALPHA * T2SP) * (LEND / MLC):         'STA. WDG. HARM. LOSS (W) @ OP TEMP
5937          WNS3 = KHS * (VPH / FREQ) ^ 2 * (1 + ALPHA * T3SP) * (LCORE / MLC):        'STA. WDG. HARM. LOSS (W) @ OP TEMP
5938          WNBAR = KHBAR * (VPH / FREQ) ^ 2 * SQR(FREQ) * (1 + ALPHA * T2RP):         'ROT. BAR HARM. LOSS (W) @ OP TEMP
5939          WNER1 = KHER * (VPH / FREQ) ^ 2 * (1 + ALPHA * T1RP):        'ROT. END RING HARM. LOSS (INLET END) (W) @ OP TEMP
5940          WNER2 = KHER * (VPH / FREQ) ^ 2 * (1 + ALPHA * T3RP):    'ROT. END RING HARM. LOSS (DISCHARGE END) (W) @ OP TEMP
5941        END IF
5942'
5943        W2 = TQFB * RPMS * SLIP / 7.0402:                 'FUND. SECONDARY I^R (W)
5944        FW = FWCOEF * (SFBTM / 1000) ^ 3 * 1000:          'FRICTION + WINDAGE (W)
5945        EF = 1 + KEDDY * FREQ ^ 2;                        'STATOR SLOT EDDY FACTOR (AVE. FOR SLOT)
5946        CLOSS = CL1 * (VPH / FREQ) ^ 2 * FREQ ^ 1.5 + CL2 * SFBTM * (VPH / FREQ) ^ 1.5:     ' NO-LOAD CORE LOSS (W)
5947        LLOSS = CSLL * TQFB ^ 2 * FREQ ^ SK               'STRAY LOAD LOSS - (W)
5948'
5949      END IF
5950        W01S = (3 * IPH ^ 2 * R10) * (LEND / MLC):        'COIL DC LOSS - INLET END (W) @ ZERO DEG. C
5952        W02S = (3 * IPH ^ 2 * R10) * EF * (LCORE / MLC):  'COIL DC LOSS - CORE @ ZERO DEG. C
5954        W03S = W01S:                                      'COIL LOSS DISCHARGE END (W) @ ZERO DEG. C
5956        W4S = ((1 - COREPU) * CLOSS + LLOSS * SLLPU);     'LOSS IN STA. TEETH (W)
5958        W5S = CLOSS * COREPU:                             'CORE LOSS IN STA. YOKE (W)
5960'
5962        W1R = W2 * (R2ER / (R2ER + R2BAR)) / 2: 'FUND. END RING LOSS @ OPERATING TEMP - (INLET END)
5964        W2R = W2 * (R2BAR / (R2ER + R2BAR)) + (1 - SLLPU) * LLOSS: 'FUND. BAR LOSS @ OPERATING TEMP
5966        W3R = W1R:                  'FUND. END RING LOSS @ OPERATING TEMP - (DISCHARGE END)
5970'
5972        WTOT1 = FW + CLOSS + LLOSS + W2 + W01S * (1 + ALPHA * T1SP) + W02S * (1 + ALPHA * T2SP) + W03S * (1 + ALPHA * T3SP);
5974        WTOTN = WNS1 + WNS2 + WNS3 + WNBAR + WNER1 + WNER2:    'TOTAL HARMONIC LOSS (W)
5976        WTOT = WTOT1 + WTOTN                                   'TOTAL FUND. LOSS (W) @ OPERATING TEMP
5980'
5981'   CALCULATE AIR FLOW, HEAT X-FER COEFFICIENTS & THERMAL CONDUCTANCES
5982'
5984        SFBEB = EBCONST * DIESELSPD * BSPEED:             'EQUIP. BLWR SPEED (rpm)
5986        IF SFBEB < .1 THEN SFBEB = .1
6002        CFMSTA = C1CFM * SFBEB:                           'VOLUMETRIC FLOW RATE - STA. (ft^3/min.)
6003        CFMROT = C2CFM * SFBEB:                           'VOLUMETRIC FLOW RATE - ROT. (ft^3/min.)
```

```
6004  DENAIRS = RHOB * (PAMB / 14.69) * (273 / (273 + T6SP)):    'AIR DENSITY (LB/FT^3) - STA. CORE
6005  DENAIRR = RHOB * (PAMB / 14.69) * (273 / (273 + T5RP)):    'AIR DENSITY (LB/FT^3) - ROT. CORE
6006  MDOTS = CFMSTA * DENAIRS / 60:                             'MASS FLOW RATE - STA. (LBm/SEC)
6008  MDOTR = CFMROT * DENAIRR / 60:                             'MASS FLOW RATE - ROT. (LBm/SEC)
6009  MDOT = MDOTS + MDOTR:                                      'MASS FLOW RATE - TOTAL (LBm/SEC)
6010'
6012  HEND1 = CSET1 * SFBTM ^ .8 + CSET2 * MDOT:                 'HEAT TRANSFER COEFF. - INLET END COILS (W/IN^2-C))
6013  HEND2 = CSET3 * SFBTM ^ .8 + CSET4 * MDOT:                 'HEAT TRANSFER COEFF. - DISCHARGE END COILS (W/IN^2-C))
6014  HEND1R = CER1 * SFBTM ^ .8 + CER3 * MDOTR:                 'HEAT X-FER COEFF. - ROT. END RING (INLET END) (W/IN^2-C))
6015  HEND2R = CER2 * SFBTM ^ .8 + CER4 * MDOTR:                 'HEAT X-FER COEFF. - ROT. END RING (DISCHARGE END) (W/IN^2-C))
6016'
6017  VSTA = CFMSTA / ASTAX:                                     'STA. DUCT VELOCITY (FT/MIN)
6020  RESTA = DENAIRS * VSTA * HDIA / (720 * .0000134):          'STA. DUCT REYNOLD'S NO. (MU @ 60C)
6022  HSTA = (1.374 / 100000!) * RESTA ^ .8 / HDIA:              'STA. VENT DUCT HEAT TRAN. COEFF. (w/(deg C*in^2)
6025  VROT = CFMROT / AROTX:                                     'ROT. VENT DUCT VELOCITY (FT/MIN)
6026  REROT = DENAIRR * VROT * HDIAR / (720 * .0000134):         'ROT. VENT DUCT REYNOLD'S NO.
6028  HROT = (1.374 / 100000) * REROT ^ .8 / HDIAR:              'ROT. VENT DUCT HEAT TRANSFER COEFF. (w/(deg C*in^2)
6090'
6105  G1S = 1 / ( 1 / (HEND1 * AEND) + 1 / GINSE):               'THERMAL CONDUCTANCE - STA. COIL END (INLET END)
6110  G3S = 1 / ( 1 / (HEND2 * AEND) + 1 / GINSE):               'THERMAL CONDUCTANCE - STA. COIL END (DISCHARGE END)
6120  G1R = HEND1R * AENDR:                                      'THERMAL SURF. CONDUCTANCE - ROT CAGE END (INLET END)
6125  G3R = HEND2R * AENDR:                                      'THERMAL SURF. CONDUCTANCE - ROT CAGE END (DISCHARGE END)
6116  G56S = 1 / (1 / GC3 + 1 / (HSTA * ASTA))
6118  G45R = 1 / (1 / GCR3 + 1 / (HROT * AROT))
6130'
6135  GAIRS = MDOTS * CPAIR;                                     '(LB/SEC)*SPECIFIC HEAT - STA. CORE AIR RISE CONDUCTANCE
6140  GAIRR = MDOTR * CPAIR:                                     '(LB/SEC)*SPICIFIC HEAT - ROT. CORE AIR RISE CONDUCTANCE.
6142  GAIR = MDOT * CPAIR
6150'
6551' CALCULATE TEMPERATURES
6552'
6586  TEND1 = (T1RP * G1R + T1SP * G1S + TAMB * GAIR + FW / 2) / (G1R + G1S + GAIR)
6587  IF BSPEED < .5 THEN
6588     TEND2 = TEND1:                                          'PREVENT OVERFLOW IN TEND2 CALC. IF BSPEED = 0
6589  ELSE
6590     TEND2 = WTOT / GAIR + TAMB
6592  END IF
8599  T1S = (W01S * (1 + ALPHA * T1SP) * WNS1 - (G1S + G12S) * T1SP + G12S * T2SP + G1S * TEND1 + C1S * T1SP / DT) * DT / C1S
6600  T2S = (W02S * (1 + ALPHA * T2SP) * WNS2 + WNS2 * G12S * T1SP - (G23S + G12S + GINS) * T2SP + G23S * T3SP + GINS * T4SP + C2S * T2SP / DT) * DT / C2S
6610  T3S = (W03S * (1 + ALPHA * T3SP) * WNS3 + WNS3 * G23S * T2SP - (G3S + G23S) * T3SP + G3S * TEND2 + C3S * T3SP / DT) * DT / C3S
6620  T4S = (W4S + GINS * T2SP - (GINS + G45S) * T4SP + G45S * T5SP + C4S * T4SP / DT) * DT / C4S
6630  T5S = (W5S + G45S * T4SP - (G56S + G45S) * T5SP + G56S * T6SP + C5S * T5SP / DT) * DT / C5S
6640  T6S = (T5SP * G56S + 2 * GAIRS * TEND1) / (G56S + 2 * GAIRS)
6650'
6660  T1R = (W1R + WNER1 - (G1R + G12R) * T1RP + G12R * T2RP + G1R * TEND1 + C1R * T1RP / DT) * DT / C1R
6670  T2R = (W2R + WNBAR - (G23R + G12R + G24R) * T2RP + G12R * T1RP + G23R * T3RP + G24R * T4RP + C2R * T2RP / DT) * DT / C2R
6680  T3R = (W3R + WNER2 - (G3R + G23R) * T3RP + G23R * T2RP + G3R * TEND2 + C3R * T3RP / DT) * DT / C3R
6690  T4R = (G24R * T2RP - (G24R + G45R) * T4RP + G45R * T5RP + C4R * T4RP / DT) * DT / C4R
6700  T5R = (G45R * T4RP + 2 * GAIRR * TEND1) / (G45R + 2 * GAIRR)
6710  ATEMPS = (T1S * LEND + T2S * LCORE + T3S * LEND) / MLC:                         'AVE. TEMP - STA.
6712  ATEMPR = (T1R * (ERTHK + BAREXT) + T2R * LCORE + T3R * (ERTHK + BAREXT)) / (LCORE + 2 * BAREXT + 2 * ERTHK):   'AVE. TEMP - ROT.
6714  DELROT = T3R - T4R:                                        'DIFFERENTIAL TEMP. BETWEEN ROTOR END RING (DISCHARGE-END) AND ROTOR CORE
```

R1AVE = (1 + ALPHA * ATEMPS) * R10:  'AVE STA. RESISTANCE/PHASE - (Ohm)
R2AVE = (1 + ALPHA * ATEMPR) * (R2BAR + R2ER) * (234.5 / (234.5 + 110)):  'AVE. ROT. CAGE RESISTANCE/PHASE - (Ohm)

DETERMINE BLOWER SPEED

```
IF BSPEED < .5 THEN
    IF T2S > HTOFS THEN
        REQBSPDS = 1!
    ELSEIF T2S > ZTOHS THEN
        REQBSPDS = .5
    ELSE REQBSPDS = 0
    END IF
ELSEIF BSPEED < 1 AND BSPEED > 0 THEN
    IF T2S > HTOFS THEN
        REQBSPDS = 1!
    ELSEIF T2S < HTOZS THEN
        REQBSPDS = 0
        ELSE REQBSPDS = .5
    END IF
ELSEIF BSPEED > .5 THEN
    IF T2S < HTOHS THEN
        REQBSPDS = 0
    ELSEIF T2S < FTOHS THEN
        REQBSPDS = .5
        ELSE REQBSPDS = 1!
    END IF
END IF
```

STATOR WDG. BLOWER SPEED

*Fig. 2E*

ROTOR END RING BLOWER SPEED

```
IF BSPEED < .5 THEN
    IF T3R > HTOFER THEN
        REQBSPDER = 1!
    ELSEIF T3R > ZTOHER THEN
        REQBSPDER = .5
        ELSE REQBSPDER = 0
    END IF
ELSEIF BSPEED < 1 AND BSPEED > 0 THEN
    IF T3R > HTOFER THEN
        REQBSPDER = 1!
    ELSEIF T3R < HTOZER THEN
        REQBSPDER = 0
        ELSE REQBSPDER = .5
    END IF
ELSEIF BSPEED > .5 THEN
    IF T3R < HTOZER THEN
        REQBSPDER = 0
    ELSEIF T3R < FTOHER THEN
        REQBSPDER = .5
        ELSE REQBSPDER = 1!
    END IF
END IF
```

*Fig. 2F*

ROTOR BAR STRESS BLOWER SPEED

```
IF BSPEED < .5 THEN
    IF ABS(DELROT) > HTOFBAR THEN
        REQBSPDBAR = 1!
    ELSEIF ABS(DELROT) > ZTOHBAR THEN
        REQBSPDBAR = .5
        ELSE REQBSPDBAR = 0
    END IF
ELSEIF BSPEED < 1 AND BSPEED > 0 THEN
    IF ABS(DELROT) > HTOFBAR THEN
        REQBSPDBAR = 1!
    ELSEIF ABS(DELROT) < HTOZBAR THEN
        REQBSPDBAR = 0
        ELSE REQBSPDBAR = .5
    END IF
ELSEIF BSPEED > .5 THEN
    IF ABS(DELROT) < HTOZBAR THEN
        REQBSPDBAR = 0
    ELSEIF ABS(DELROT) < FTOHBAR THEN
        REQBSPDBAR = .5
        ELSE REQBSPDBAR = 1!
    END IF
END IF
```

DETERMINE LIMITING CASE BLOWER SPEED

```
IF REQBSPDS >= REQBSPDER AND REQBSPDS >= REQBSPDBAR THEN
    EBSPCM = REQBSPDS
ELSEIF REQBSPDER >= REQBSPDS AND REQBSPDER >= REQBSPDBAR THEN
    EBSPCM = REQBSPDER
ELSEIF REQBSPDBAR >= REQBSPDS AND REQBSPDBAR >= REQBSPDER THEN
    EBSPCM = REQBSPDBAR
END IF
```

CALCULATE TORQUE LIMITS & DERATION

```
TQLIMS = SGN(TQFB) * (K1TQ - K2TQ * T2S):            ' TORQUE LIMIT IMPOSED BY STA. COPPER TEMP.
TQLIMER = SGN(TQFB) * (K1TQER - K2TQER * T3R):       ' TORQUE LIMIT IMPOSED BY ROT. END RING TEMP.
TQLIMB = SGN(TQFB) * (K1TQB - K2TQB * ABS(DELROT)):  ' TORQUE LIMIT IMPOSED BY ROT. BAR EXT. STRESS

IF ABS(TQLIMS) <= ABS(TQLIMER) AND ABS(TQLIMS) <= ABS(TQLIMB) THEN
    TQLIM = TQLIMS
ELSEIF ABS(TQLIMER) <= ABS(TQLIMS) AND ABS(TQLIMER) <= ABS(TQLIMB) THEN
    TQLIM = TQLIMER
ELSEIF ABS(TQLIMB) <= ABS(TQLIMS) AND ABS(TQLIMB) <= ABS(TQLIMER) THEN
    TQLIM = TQLIMB
END IF
```

*Fig. 2G*

| | |
|---|---|
| ' AEND | : SURF. AREA OF STATOR COIL END TURNS (in^2) |
| ' AENDR | : SURF. AREA OF ROTOR CAGE END - (in^2) |
| ' ALPHA | : 1 / 234.5 (reciprocal of the inferred absolute zero for stator copper) |
| ' AROT | : TOTAL ROT. DUCT SURFACE AREA FOR HEAT X-FER - (in^2) |
| ' AROTX | : TOT. ROT. DUCT X-SECT PER MACHINE - (ft^2) |
| ' ASTA | : TOTAL STA. DUCT SURFACE AREA FOR HEAT X-FER - (in^2) |
| ' ASTAX | : TOT. STA. DUCT X-SECT (ft^2) |
| ' BAREXT | : ROTOR BAR EXTENSION (ONE END) - (in.) |
| ' CER1 | : ROTOR END AREA HEAT X-FER FACTOR (INLET END) - ROTOR SPEED COMPONENT |
| ' CER2 | : ROTOR END AREA HEAT X-FER FACTOR (DISCHARGE END) - ROTOR SPEED COMPONENT |
| ' CER3 | : ROTOR END AREA HEAT X-FER FACTOR (INLET END) - CORE AIR FLOW COMPONENT - ([W/in^2-C]/[lbm/sec]) |
| ' CER4 | : ROTOR END AREA HEAT X-FER FACTOR (DISCHARGE END) - CORE AIR FLOW COMPONENT ([W/in^2C]/[lbm/sec]) |
| ' CL1 | : CORE LOSS COEFF. - FUND. FREQ. LOSS |
| ' CL1 | : CORE LOSS COEFF. - PULSATION LOSS |
| ' CPAIR | : SPECIFIC HEAT OF AIR - (W-sec)/(lbm-C) |
| ' COREPU | : (STA YOKE CORE LOSS)/(TOTAL CORE LOSS) |
| ' CSET1 | : STA. END TURN HEAT X-FER FACTOR (ROTOR SPEED COMPONENT) - INLET END |
| ' CSET2 | : STA. END TURN HEAT X-FER FACTOR (THRU-AIR FLOW COMPONENT) - INLET END - ([W/in^2-C]/[lbm/sec]) |

*Fig. 2H*

| | |
|---|---|
| 'CSET3 | : STA. END TURN HEAT X-FER FACTOR (ROTOR SPEED COMPONENT) - DISCHARGE END |
| 'CSET4 | : STA. END TURN HEAT X-FER FACTOR (THRU-AIR FLOW COMPONENT) - DISCHARGE END - ([W/in^2-C]/[lbm/sec]) |
| 'CSLL | : SLL COEFF. |
| 'C1CFM | : STATOR CORE CFM FRACTION - (stacfm/EBrpm) |
| 'C2CFM | : ROTOR CORE CFM FRACTION - (rotcfm/EBrpm) |
| 'C1R | : HEAT CAPACITY - ROTOR END RING (INLET END) - (W-sec/C) |
| 'C2R | : HEAT CAPACITY - ROTOR BARS - (W-sec/C) |
| 'C3R | : HEAT CAPACITY - ROTOR END RING (DISCHARGE END) - (W-sec/C) |
| 'C4R | : HEAT CAPACITY - ROTOR CORE - (W-sec/C) |
| 'C1S | : HEAT CAPACITY - STATOR COIL END TURNS (INLET END) - (W-sec/C) |
| 'C2S | : HEAT CAPACITY - STATOR COIL SLOT PORTION - (W-sec/C) |
| 'C3S | : HEAT CAPACITY - STATOR COIL END TURNS (DISCHARGE END) - (W-sec/C) |
| 'C4S | : HEAT CAPACITY - STATOR TEETH - (W-sec/C) |
| 'C5S | : HEAT CAPACITY - STATOR YOKE - (W-sec/C) |
| 'DT | : INTEGRATION INTERVAL - (sec) |
| 'EBCONST | : EQUIPMENT BLOWER CONSTANT - (EBrpm/DIESELrpm) |
| 'ERTHK | : AXIAL THK'NESS OF ROTOR CAGE END RING - (in.) |
| 'FREQB | : FREQUENCY @ PWM CORNER POINT - (Hz) |
| 'FTOHBAR | : ROT. END RING/CORE DIFFERENTIAL TEMP. BLOWER TRANSISTION TEMP. - FULL TO 1/2 SPEED (C) |
| 'FTOHER | : ROT. END RING BLOWER TRANSISTION TEMP. - FULL TO 1/2 SPEED (C) |

*Fig. 21*

| | |
|---|---|
| 'FTOHS | : STA. WDG. BLOWER TRANSISTION TEMP. - FULL TO 1/2 SPEED (C) |
| 'FWCOEF | : F&W COEFFICIENT (FORT WAYNE FORMULA) |
| 'GC3 | : THERMAL CONDUCTANCE - STATOR CORE - (W/C) |
| 'GCR3 | : THERMAL CONDUCTANCE - ROTOR CORE - (W/C) |
| 'GINS | : THERMAL CONDUCTANCE - STATOR SLOT COIL INSULATION - (W/C) |
| 'GINSE | : THERMAL CONDUCTANCE - STATOR COIL END TURN INSULATION - (W/C) |
| 'G12R | : THERMAL CONDUCTANCE BETWEEN NODE 1 & 2 - ROTOR BAR - (W/C) |
| 'G23R | : THERMAL CONDUCTANCE BETWEEN NODE 2 & 3 - ROTOR CORE - (W/C) |
| 'G24R | : THERMAL CONDUCTANCE BETWEEN NODE 2 & 4 - ROTOR CORE - (W/C) |
| 'G12S | : THERMAL CONDUCTANCE BETWEEN NODE 1 & 2 - STATOR COIL - (W/C) |
| 'G23S | : THERMAL CONDUCTANCE BETWEEN NODE 2 &3 - STATOR CORE - (W/C) |
| 'G45S | : THERMAL CONDUCTANCE BETWEEN NODE 4 & 5 - STATOR CORE - (W/C) |
| 'HDIA | : HYDRAULIC DIAMETER OF STATOR VENT DUCT - (in.) |
| 'HDIAR | : HYDRAULIC DIAMETER OF ROTOR VENT DUCT - (in.) |
| 'HTOFBAR | : ROT. END RING/CORE DIFFERENTIAL TEMP. BLOWER TRANSISTION TEMP. - 1/2 TO FULL SPEED (C) |
| 'HTOFER | : ROT. END RING BLOWER TRANSISTION TEMP. - 1/2 TO FULL SPEED (C) |
| 'HTOFS | : STA. WDG. BLOWER TRANSISTION TEMP. - 1/2 TO FULL SPEED (C) |
| 'HTOZBAR | : ROT. END RING/CORE DIFFERENTIAL TEMP. BLOWER TRANSISTION TEMP. - 1/2 TO ZERO SPEED (C) |
| 'HTOZER | : ROT. END RING BLOWER TRANSISTION TEMP. - 1/2 TO ZERO SPEED (C) |
| 'HTOZS | : STA. WDG. BLOWER TRANSISTION TEMP. - 1/2 TO ZERO SPEED (C) |

*Fig. 2J*

| | | |
|---|---|---|
| ' KEDDY | : | CONSTANT USED IN STATOR SLOT EDDY FACTOR CALCULATION |
| ' KHBAR | : | ROT. BAR TIME HARMONIC LOSS COEFF. - DEFINED AT ZERO C |
| ' KHER | : | ROT. CAGE END RING TIME HARMONIC LOSS COEFF. (PER END RING) - DEFINED AT ZERO C |
| ' KHS | : | STA. WDG. TIME HARMONIC LOSS COEFF. - DEFINED AT ZERO C |
| ' K1TQ | : | STA. WDG. DERATING FACTOR (220C IS S.S. LIMIT) - (lbf-ft) |
| ' K1TQB | : | ROT. BAR EXT. STRESS DERATING FACTOR (50C IS S.S. LIMIT) - (lbf-ft) |
| '' K1TQER | : | ROT. END RING DERATING FACTOR (200C IS S.S. LIMIT) - (lbf-ft) |
| ' K2TQ | : | STA. WDG. DERATING FACTOR - (lbf-ft/C) |
| ' K2TQB | : | ROT. BAR EXT. STRESS DERATING FACTOR - (lbf-ft/C) |
| ' K2TQER | : | ROT. END RING DERATING FACTOR - (lbf-ft/C) |
| ' LCORE | : | CORE LENGTH - (in.) |
| ' LEND | : | AXIAL LENGTH OF COIL END TURN/END - (in.) |
| ' MLC | : | MEAN LENGTH OF COIL - (in.) |
| ' OFFSET | : | INVERTER VOLTAGE OFF-SET @ ZERO SPEED - (Vph-rms) |
| '' PIE | : | 3.14159 |
| ' POLES | : | NUMBER OF MOTOR POLES |
| ' RHOB | : | DENSITY OF AIR @ SEA LEVEL & ZERO C - (lbm/ft^3) |
| ' R10 | : | STATOR WDG. RESISTANCE/PHASE @ ZERO C - (Ohm) |
| ' R2BAR | : | ROTOR CAGE RESISTANCE @ 110 C - BAR CONTRIBUTION ONLY - (Ohm) |
| ' R2ER | : | ROTOR CAGE RESISTANCE @ 110 C - END RING CONTRIBUTION ONLY - (Ohm) |

*Fig. 2K*

DICTIONARY - OUTPUT VARIABLES TO LOCOMOTIVE CONTROL SOFTWARE

- SK : SLL FREQ. EXPONENT
- SLLPU : (STA TEETH SLL)/(TOTAL SLL)
- TINIT : INITIAL TEMPERATURE (C)
- VDROP : INVERTER VOLTAGE DROP (Vdc)
- ZTOHBAR : ROT. END RING/CORE DIFFERENTIAL TEMP. BLOWER TRANSISTION TEMP. - ZERO TO 1/2 SPEED (C)
- ZTOHER : ROT. END RING BLOWER TRANSISTION TEMP. - ZERO TO 1/2 SPEED (C)
- ZTOHS : STA. WDG. BLOWER TRANSISTION TEMP. - ZERO TO 1/2 SPEED (C).

- ATEMPR : AVERAGE ROTOR CAGE TEMPERATURE (C)
- ATEMPS : AVERAGE STATOR TEMPERATURE (C)
- EBSPCM : EQUIPMENT BLOWER SPEED COMMAND (0 = STOP, .5 = HALF, 1.0 = FULL)
- R1AVE : STATOR WDG. RESISTANCE/PHASE - (Ohm) @ "ATEMPS" TEMPERATURE
- R2AVE : ROTOR CAGE RESISTANCE/PHASE - (Ohm) @ "ATEMPR" TEMPERATURE
- TQLIM : MOTOR TORQUE LIMIT - LIMITING CASE - (lbf-ft)

*Fig. 2L*

DICTIONARY - OUTPUT VARIABLES FOR DIAGNOSTIC PURPOSES

- REQBSPDBAR : EQUIPMENT BLOWER SPEED REQUEST - ROT. CAGE BAR EXT. STRESS - (0 = STOP, .5 = HALF, 1.0 = FULL)
- REQBSPDER : EQUIPMENT BLOWER SPEED REQUEST - ROT. CAGE END RING (DISCHARGE END) - (0 = STOP, .5 = HALF, 1.0 = FULL)
- REQBSPDS : EQUIPMENT BLOWER SPEED REQUEST - STA. COIL (CORE PORTION) - (0 = STOP, .5 = HALF, 1.0 = FULL)
- TQLIMB : MOTOR TORQUE LIMIT - ROT. CAGE BAR EXT. STRESS - (lbf-ft)
- TQLIMER : MOTOR TORQUE LIMIT - ROT. CAGE END RING (DISCHARGE END) - (lbf-ft)
- TQLIMS : MOTOR TORQUE LIMIT - STA. COIL (CORE PORTION) - (lbf-ft)
- DELROT : DIFFERENTIAL TEMP. (ROT. END RING - ROT. CORE) - (deg. C)
- T2S : STA. COIL TEMP. (CORE PORTION) - (deg. C)
- T3R : ROT. END RING TEMP. (DISCHARGE END) - (deg. C)
- SLIP : ROTOR SLIP - (Per Unit)

*Fig. 2M*

THERMAL PROTECTION FOR AC TRACTION MOTORS USING TEMPERATURE ESTIMATIONS TO CALCULATE TORQUE LIMITS AND BLOWER SPEED REQUIREMENTS

SPEECH INFORMATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

This invention relates generally to a control system for providing an AC traction motor with protection against damaging thermal overloads and, more particularly, to a system using information measured and supplied by a vehicle propulsion system controller to predict internal motor temperatures in near real time and to control the operation of the motor's inverter and blower fan.

2. Description of the Related Art

Alternating current (AC) traction motors are conventionally used in conjunction with electronic inverter drives as a means for transportation vehicle propulsion. The traction motor's capability to operate outside its continuous operating envelope for a short period of time is typically used to obtain optimum vehicle performance; however, the overheating which results reduces the motor life expectancy. Under these conditions, thermal protection is necessary to prevent damage of the stator winding insulation system and rotor cage.

Overload protection for rotating electrical machinery is intended to provide a means of preventing excessive overheating of the electrical winding system. Embedded winding sensors are used in conventional thermal protection schemes. Most large machines used in industrial applications generally employ resistance temperature detectors (RTDs) embedded in the stator windings for the purpose of directly sensing stator winding temperatures.

A more sophisticated technique is described in David R. Boothman et al., "Thermal Tracking—a Rational Approach to Motor Protection," IEEE Transactions on Power Apparatus and Systems, Vol. PAS-93 (Sept.-Oct. 1974), pp. 1335-1344. The Boothman article describes an overload analog relay with a design based on knowledge of the rotating machine's thermal circuit and feedback from an embedded winding detector. The system tracks motor temperature and provides a disconnect signal if a limit condition is exceeded.

Historically AC traction motors have not been protected against damaging thermal overloads. The location of the motors exposes temperature sensor lead cables to impacts from track debris and hostile environmental conditions. The possibility of false indications or damage to the sensor is usually considered a system reliability issue which precludes the use of embedded winding sensors.

SUMMARY OF THE INVENTION

Accordingly, an object of the present invention is to provide a method of supplying thermal protection for AC traction motors.

Another object of the present invention is to provide a method for determining and adjusting motor ventilation levels during use of AC traction motors.

The development of modern microprocessor-based controls enables the implementation of a computer algorithm in the vehicle control system which can help provide thermal protection automatically when necessary in a manner compatible with the vehicle power source and tractive effort characteristics. No abrupt change or sudden loss of tractive effort occurs. Another benefit of the control system is that it permits control of the motor ventilating blower speed as a function of motor temperature which assists in the minimization of vehicle on-board auxiliary power consumption.

Briefly, in accordance with a preferred embodiment of the invention, a thermal protection apparatus for an AC traction motor including a stator, a rotor, a blower fan, and an inverter comprises means for measuring ambient air temperature of the motor; means for measuring air atmospheric pressure of the motor; and means for using the measured ambient temperature and atmospheric pressure values for estimating a plurality of temperatures in the AC traction motor. Further provided are means for calculating a plurality of motor torque limits imposed by the plurality of estimated temperatures and means for controlling the inverter by providing a signal comprising the lowest of the calculated plurality of motor torque limits to an inverter controller. An optional fan control feature includes means for calculating a plurality of blower speed requirements imposed by the plurality of estimated temperatures and means for setting the blower speed of the motor to the highest of the calculated plurality of blower speed requirements.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIGS. 2a-2g include computer source code listings which may be utilized to control operation of a computer in accordance with the present thermal protection method;

FIGS. 2h-2m include a dictionary of parameters used in the computer source code of FIGS. 2a-2g;

DETAILED DESCRIPTION OF A PREFERRED EMBODIMENT OF THE INVENTION

Figure 1:
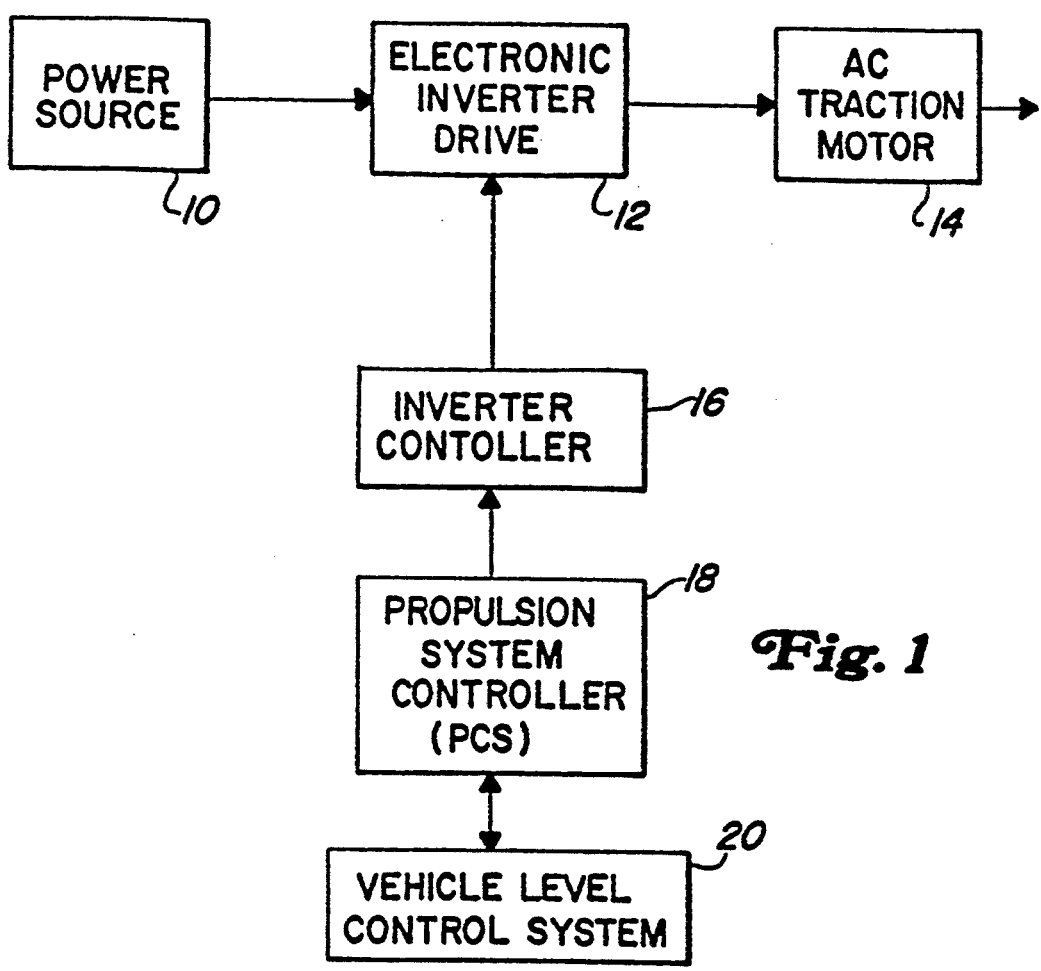
FIG. 1 is a block diagram depicting the basic elements of a vehicle AC propulsion system.
Figure 1A:
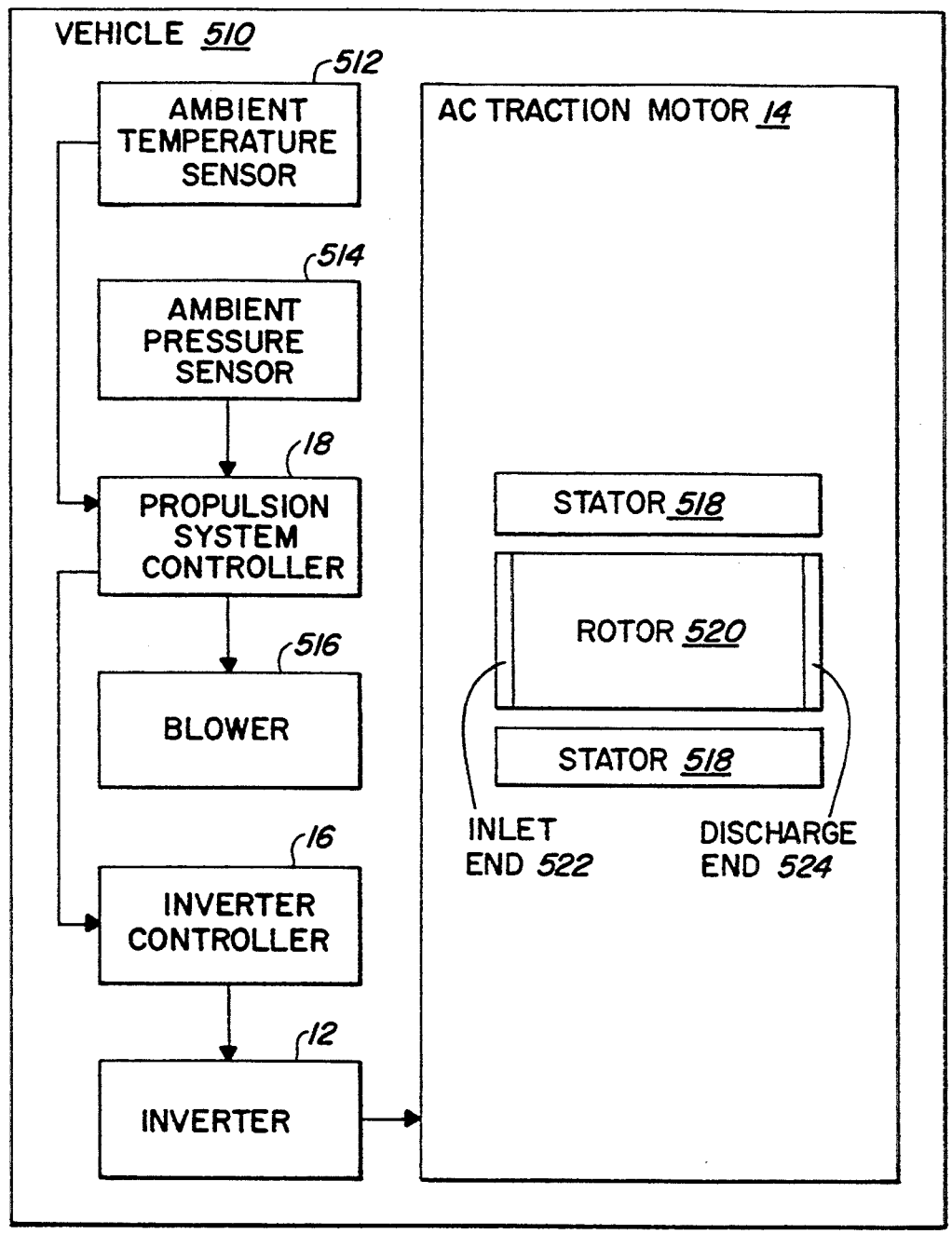
FIG. 1a is a block diagram of a vehicle of the present invention.

FIG. 1 is a block diagram depicting elements of a vehicle AC propulsion system, and FIG. 1a is a block diagram of a vehicle of the present invention. A vehicle power source 10 may comprise any desired power source including, for example, a diesel engine/alternator, battery, or wayside power source such as a third rail or high voltage catenary. Electrical power is conditioned by solid state inverter drives shown as inverters 12 (only one of which is shown in FIG. 1) which have respective inverter controllers 16 to regulate the voltage and frequency applied to respective AC traction motors 14 in a manner consistent with the needs of the vehicle application. Inverters 12 are coordinated by a single propulsion system controller (PSC) 18 which controls each respective inverter controller and inverter for each axle (axles not shown) of a vehicle 510. A vehicle level control system 20 can be used to send commands to PSC 18.

Figure 2:
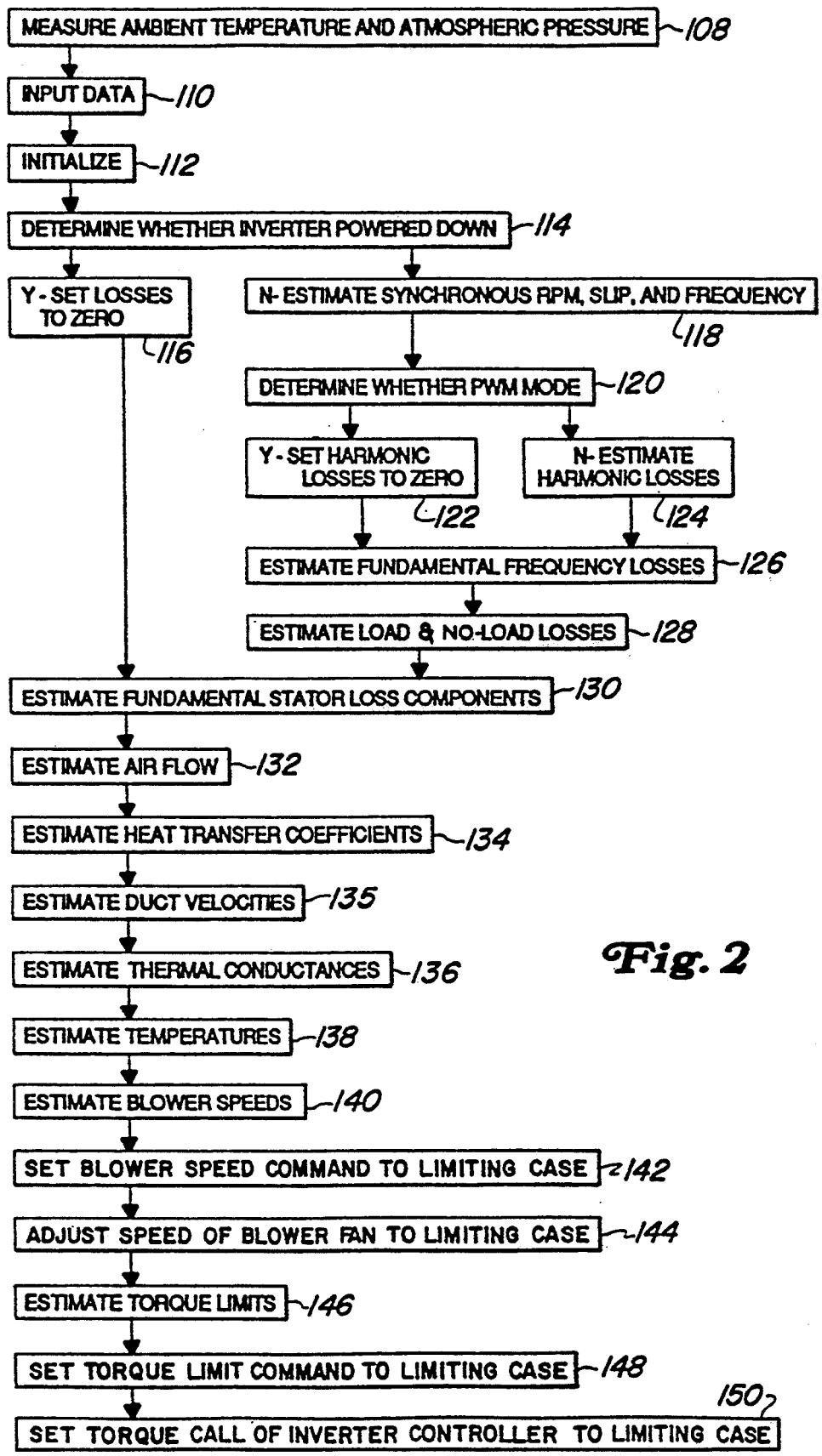
FIG. 2 is a flowchart illustrating the steps in the thermal protection system of the present invention.

FIG. 2 is a flowchart illustrating steps in the thermal protection system of the present invention. In one embodiment, the flowchart software resides within the propulsion system controller 18 and is executed by an on-board microprocessor. The effect on the motor propulsion system of the execution of the thermal protection system and the resulting inverter controller signals is a smooth and gradual reduction in motor torque, and therefore vehicle tractive effort, which simultaneously limits motor temperatures to predetermined values. No abrupt change or total loss of vehicle tractive effort occurs. The motor is not disconnected from its power source as is often the situation in conventional protection methods.

After the inverter is started, at a measurement step 108, the ventilating air ambient temperature (TAMB in °C.) and the atmospheric pressure (PAMB in psi) of ventilating air are measured in the local area ambient in which the motor is operated by vehicle level sensors (512 and 514 in FIG. 1a). In one embodiment, ambient temperature is measured by a thermocouple in the vehicle, and ambient pressure is measured with a barometric pressure transducer in the vehicle.

At an input step 110, the measured ambient temperature and atmospheric pressure, as well as the following additional vehicle system input signals are supplied to the algorithm:

TQFB: motor air gap torque (from inverter control calculations) (lb$_f$-ft)
VL1: inverter DC link voltage (volts DC)
SLIPRPM: rotor slip speed (rpm)
SFBTM: traction motor speed feedback (rpm)
PWM: inverter mode (1 implies PWM mode)
DIESELSPD: engine speed (rpm)
BSPEED: blower speed status (0=stop, 0.5=half, 1=full)
IPHPK: fundamental phase current peak (amps)
RUNIV: inverter status Boolean (1 implies active inverter)

In a preferred embodiment, a plurality of temperature variables are stored and calculated for each of the stator, 518 rotor, 520 and inlet and discharge end regions 522 and 524, respectively (shown in FIG. 1a). In one embodiment, there are six stator winding nodes (T1SP, T2SP, ..., T6SP) and five rotor core nodes (T1RP, T2RP, ..., T5RP).

At step 112, the initial temperature variables are set and the phase current RMS value is calculated by dividing the input value of IPHPK (peak value of fundamental phase current) by the square root of 2.

Then it is determined whether the protection system must be initialized. An initialization is necessary when the microprocessor system is first activated and no values are present in the initial temperature variables. In the preferred system, even when the inverter and vehicle are shut down, a battery will keep the processor in the PSC active, and then each of the stator and rotor node temperature variables is set to the respective estimated temperature of the previous run. If initialization is needed, each of the stator and rotor node temperatures is set to an initial temperature value TINT which is calculated for each node using the equation:

$$TINT = (T_p - Tamb_p) * e^{-(t/const)} + Tamb,$$

wherein $T_p$ is the previous temperature stored immediately prior to inverter shut down; Tamb is the present ambient temperature; $Tamb_p$ is the previous ambient temperature; t is the elapsed time in minutes since PSC 18 has been without power; and const is the machine thermal time constant in minutes assuming a rotor at a standstill with no ventilation. The time constant, which varies with motor size, is 34.6 minutes in one embodiment.

An alternative method for determining motor initial conditions is to use the inverter to measure each motor's hot resistance immediately prior to providing power to the inverter. The hot resistance value can be used to calculate each motor's average winding temperature which is then used as a basis for the initial condition temperatures. This strategy has the advantage that it is independent of the status of blower 516 (shown in FIG. 1a).

At step 114 the RUNINV input value is used to determine whether the inverter is active (and thus a load on the system). If RUNINV is less than 1 (i.e., there is no load), then at step 116 each of the simulation losses CLOSS (no load core loss), W2 (fundamental secondary I R loss), FW (friction and windage loss), IPH (RMS value of motor phase current), LLOSS (stray load loss), WNS1, WNS2, WNS3 (stator winding harmonic losses), WNBAR (rotor bar harmonic loss), WNER1 (rotor end ring harmonic loss at the inlet end), and WNER2 (rotor end ring harmonic loss at the discharge end) is set to zero and SFBTM (traction motor speed feedback) is set to a finite value less than or equal to 0.1 (to prevent divisions by zero). Then the algorithm proceeds directly to step 130.

If RUNINV is 1, then at step 118 the synchronous RPM (RPMS) is calculated by adding the input signal magnitudes SLIPRPM (rotor slip speed) and SFBTM (which is set to a finite value such as 0.1 if less than a predetermined finite value). If RPMS is less than a predetermined value, then it is set to that predetermined value for the purpose of avoiding a zero division. Any small number less than or equal to 2 can be used as the predetermined value. Additionally at step 118 the SLIP is calculated by subtracting SFBTM/RPMS from 1, and the frequency (FREQ) is calculated by multiplying RPMS by the number of poles and dividing by 120.

The inverter mode can be either PWM (pulse width modulation) or a square wave. At step 120, the PWM input value is used to determine whether the inverter is in PWM or square wave mode.

If PWM is greater than 0 and the inverter is thus in PWM mode, at step 122 the phase voltage is calculated without harmonics using the equation of line 5926 in FIGS. 2a–2g and the stator, bar, and endring harmonic losses are set to 0. The equations shown in the algorithm of FIGS. 2a–2g are all for purposes of example only. There are a number of techniques for modeling the losses and the other relevant parameters, and the invention is not limited to the specific techniques shown in FIGS. 2a–2g.

If PWM is not greater than zero, then the inverter is in square wave mode. At step 124 the phase voltage is calculated with harmonics and the stator winding, rotor bar, and the rotor endring harmonic losses are calculated using the equations of lines 5934–5940 of FIGS. 2a–2g.

Regardless of whether the inverter is in PWM or square wave mode, at step 126 the fundamental secondary I$^2$R loss, the friction and windage loss, and the average stator slot eddy factor are calculated using the equations of lines 5943–5945 of FIGS. 2a–2g.

At step 128, no-load core loss and stray load loss are calculated using the equations of lines 5947–5948 of FIGS. 2a–2g.

Regardless of whether the inverter is powered down (RUNINV<1), at step 130, the individual stator, bar, and endring fundamental losses are calculated, and the combination of total harmonic and fundamental losses is calculated using the equations in lines 5950–5976 of FIGS. 2a–2g.

At step 132 air density adjustments due to altitude and ambient temperature variations are made to better estimate mass flow rates. First the equipment blower speed (SFBEB) is calculated by multiplying the motor's equipment blower constant by the engine speed input parameter and the blower speed input parameter. If SFBEB is less than a predetermined finite value such as 0.1 rpm, SFBEB is set to that predetermined value. The volumetric flow rates of the stator and rotor are calculated by multiplying SFBEB by the motor's stator core CFM (cubic feet per minute) fraction and rotor core CFM fraction, respectively. The air density calculations which are used to calculate the mass flow rates consider the prevailing ambient pressure and the rotor core duct and stator core duct air temperatures using the equations in lines 6004–6009 of FIGS. 2a–2g.

At step 134, the heat transfer coefficients are calculated. The heat transfer coefficients of the end windings and rotor end rings are assumed to be functions of rotor speed, and mass flow rate through the stator and rotor cores, as used in the equations of lines 6012–6015 of FIGS. 2a–2g.

At step 135, the rotor and stator duct air velocities (ft/min), Reynold's numbers, and duct heat transfer coefficients are calculated using the equations in lines 6017–6028 of FIGS. 2a–2g. The duct Reynold's Numbers are adjusted for air density changes.

At step 136, thermal conductances are calculated for the stator end coils and the rotor cage ends using the equations of lines 6105–6128. Stator, rotor, and total core air rise conductances are calculated by multiplying the specific heat with the respective mass flow rate as shown in lines 6135–6142 of FIGS. 2a–2g.

At step 138, the air temperature at the inlet and outlet ends of the motor, the stator and rotor nodal temperatures, the stator and rotor average temperatures, and the average stator and rotor resistances are calculated.

The temperature at the inlet end of the motor is calculated using the formula on line 6586 of FIGS. 2a–2g. To determine the temperature at the outlet end of the motor, the input value of BSPEED is evaluated. If BSPEED is less than 0.5, then the outlet air end air temperature is set to equal the inlet end air temperature because the blower is off. If BSPEED is not less than 0.5, then the air temperature at the outlet end of the motor is calculated with the total fundamental and harmonic losses, the total air rise conductance, and the ambient temperature, as shown in the equation of line 6590 of FIGS. 2a–2g.

In one embodiment, the stator and rotor nodal temperatures are calculated with numerical integration of system differential equations. For example, numerical integration methods such as Runge-Kutta methods or, as shown in lines 6595–6700 of FIGS. 2a–2g, Euler's method, can be used. The rotor and stator average temperatures and the rotor endring and rotor core differential temperatures are calculated using the equations in lines 6710–6714 of FIGS. 2a–2g. The average rotor and stator resistances per phase are calculated using motor specific constants and the calculated average rotor and stator temperatures.

At step 140, the blower speed requirements are estimated. To calculate stator winding blower speed control requirements, the input value of the blower speed (BSPEED) is evaluated. If BSPEED is less than 0.5, then it is determined whether the calculated stator coil temperature at a predetermined one of the nodes is greater than the HTOFS (stator winding blower transition temperature between ½ to full speed). If so, then the required blower speed of the stator (REQBSDS) is set to 1 (full speed). If not, then it is determined whether the calculated stator coil temperature is greater than ZTOHS (stator winding blower transition temperature between zero to ½ speed). If so, then REQBSDS is set to 0.5 (half speed). If not, then REQBSDS is set to 0 (zero).

If the input value of BSPEED was not less than 0.5, it is determined whether BSPEED is between 0 and 1. If so, then it is determined whether the calculated stator coil temperature is greater than HTOFS. If so, then REQBSPDS is set to 1. If not, then it is determined whether the calculated stator coil temperature is less than HTOZS (stator winding blower transition temperature between ½ to zero speed). If so, then REQBSPDS is set to 0. If not, REQBSPDS is set to 0.5.

If the input value of BSPEED was not less than 0.5 or between 0 and 1, then it is determined whether BSPEED is greater than 0.5. If so, than it is determined whether the calculated stator coil temperature is less than HTOZS. If so, then the REQBSPDS is set 0. If not, it is determined whether the calculated stator coil temperature is greater than FTOHS (stator winding blower transition temperature between full to ½ speed). If so, then REQBSPDS is set to 0.5. If not, REQBSPDS is set to 1.

To calculate rotor endring blower speed control requirements, the same steps as discussed respect to the calculation of stator winding blower speed control requirements are performed with the following different parameters:

outlet end endring in place of stator coil
HTOFER in place of HTOFS
ZTOHER in pace of ZTOHS
HTOZER in place of HTOZS
FTOHER in place of FTOHS REQBSPDER in place of REQBSPDS.

To calculate rotor bar blower speed control requirements, the same steps as discussed with respect to the calculation of stator winding blower speed control requirements are performed with the following different parameters:

differential temperature between rotor end ring and rotor core in place of stator coil temperature
HTOFBAR in place of HTOFS
ZTOHBAR in pace of ZTOHS
HTOZBAR in place of HTOZS
FTOHBAR in place of FTOHS
REQBSPDBAR in place of REQBSPDS.

After the values of REQBSPDS, REQBSPDER, and REQBSPDBAR are obtained, at step 142 the largest value is determined for use as the BSPEED command in the motor. It is determined whether REQBSPDS is greater than or equal to REQBSPDER and REQBSPDBAR. If so, then EBSPCM (the blower speed command) is set to REQBSPDS. If not, it is determined whether REQBSPDER is greater than or equal to REQBSPDS and REQBSPDBAR. If so, then the EBSPCM command is set to REQBSPDER. If not, it is determined whether REQBSPDBAR is greater than or equal to REQBSPDER and REQBSPDS. If so, then the EBSPCM command is set to REQBSPDBAR. If not then the EBSPCM command is unchanged.

At step 144, the vehicle control level system uses the EBSPCM command to adjust the speed of the blower fan to the limiting case. This "adjustment" will result in a change of blower speed only if the latest EBSPCM command is different than the previous EBSPCM command.

Next, at step 146, the torque limits are estimated. Motor torque limits are calculated for each protected component by the following expression (the expression below is for the motor stator winding; other component expressions are identical in form):

$$TQLIMS = SGN (TQFB) * (K1TQ - K2TQ * T2S),$$

wherein TQLIMS represents the motor toque limit imposed by the stator winding temperature; K1TQ represents the constant related to the maximum permissible stator winding temperature; K2TQ represents the constant related to desired time rate of change of motor torque; T2S represents the calculated stator winding temperature at a predetermined one of the stator nodes; and SGN (TQFB) represents a function which provides the sign (positive or negative) of the motor torque (provides for operation in motoring or braking modes).

The value of K1TQ is obtained using the desired value for K2TQ (rate of change of motor torque per degree of temperature) as follows:

$$K1TQ = TQRATE + K2TQ * TSTALIM,$$

wherein TQRATE represents the maximum permissible continuous value of motor torque with full air flow; and TSTALIM represents the maximum permissible continuous stator winding hot spot temperature corresponding to TQRATE.

The torque limit imposed by rotor endring temperature (TQLIMER) is calculated as discussed with respect to TQLIMS above with the following different parameters:
K1TQER in place of K1TQ
K2TQER in place of K2TQ
T3R in place of T2S
TERLIM in place of TSTALIM,
wherein T3R is the calculated rotor cage end ring temperature at the discharge end and TERLIM is the maximum permissible continuous rotor end ring temperature corresponding to TQRATE.

The torque limit imposed by rotor bar extension stress (TQLIMB) is calculated as discussed with respect to TQLIMS above with the following different parameters:
K1TQB in place of K1TQ
K2TQB in place of K2TQ
ABS(DELROT) in place of T2S
TBARLIM in place of TSTALIM,
wherein ABS(DELROT) is the absolute value of the calculated differential temperature between the estimated rotor cage endring temperature at the discharge end and a predetermined one of the estimated rotor core temperatures (discharge end) and TBARLIM is the maximum permissible differential temperature between rotor end ring and rotor core corresponding to TQRATE. Each of TQRATE, TSTALIM, TERLIM, and TBARLIM varies with motor model.

After the values of TQLIMS, TQLIMER, and TQLIMB are obtained, at step 148 the smallest value is used as the torque limit (TQLIM) command in the motor. It is determined whether ABS(TQLIMS) is less than or equal to ABS(TQLIMER) and ABS(TQLIMB). If so, then the TQLIM command is set to TQLIMS. If not, it is determined whether ABS(TQLIMER) is less than or equal to ABS(TQLIMS) and ABS(TQLIMB). If so, then the TQLIM command is set to TQLIMER. If not, it is determined whether ABS(TQLIMB) is less than or equal to ABS(TQLIMER) and ABS(TQLIMS). If so, then the TQLIM command is set to TQLIMB. If not then the TQLIM command is unchanged.

At step 150, the TQLIM command is used to adjust the torque call (TQFB) in the inverter control to the limiting case if the absolute value of the TQLIM command (the limit value imposed by the protection system) is less than the absolute value of TQFB (the torque call value requested by the vehicle level control system). The inverter control sends this new torque command value to the inverter which commands this new value of torque from the respective motor. When the motor is being derated by the protection system, the new torque limit value will be lower than the previous torque limit value to limit motor heating.

When PSC 18 is active, the protection system is executed continuously at regular intervals for each vehicle traction motor using the input signals defined above. At the conclusion of each interval, the following output signals are passed to vehicle system controller 20:
TQLIM: motor torque limit
ATEMPS: average stator temperature (°C.)
ATEMPR: average rotor cage temperature (°C.)
EBSPCM: motor ventilating blower speed command (0=stop, 0.5=one-half, 1=full)
R1AVE: stator winding resistance/phase (ohm)
R2AVE: rotor cage resistance/phase (ohm)

Figure 3A:
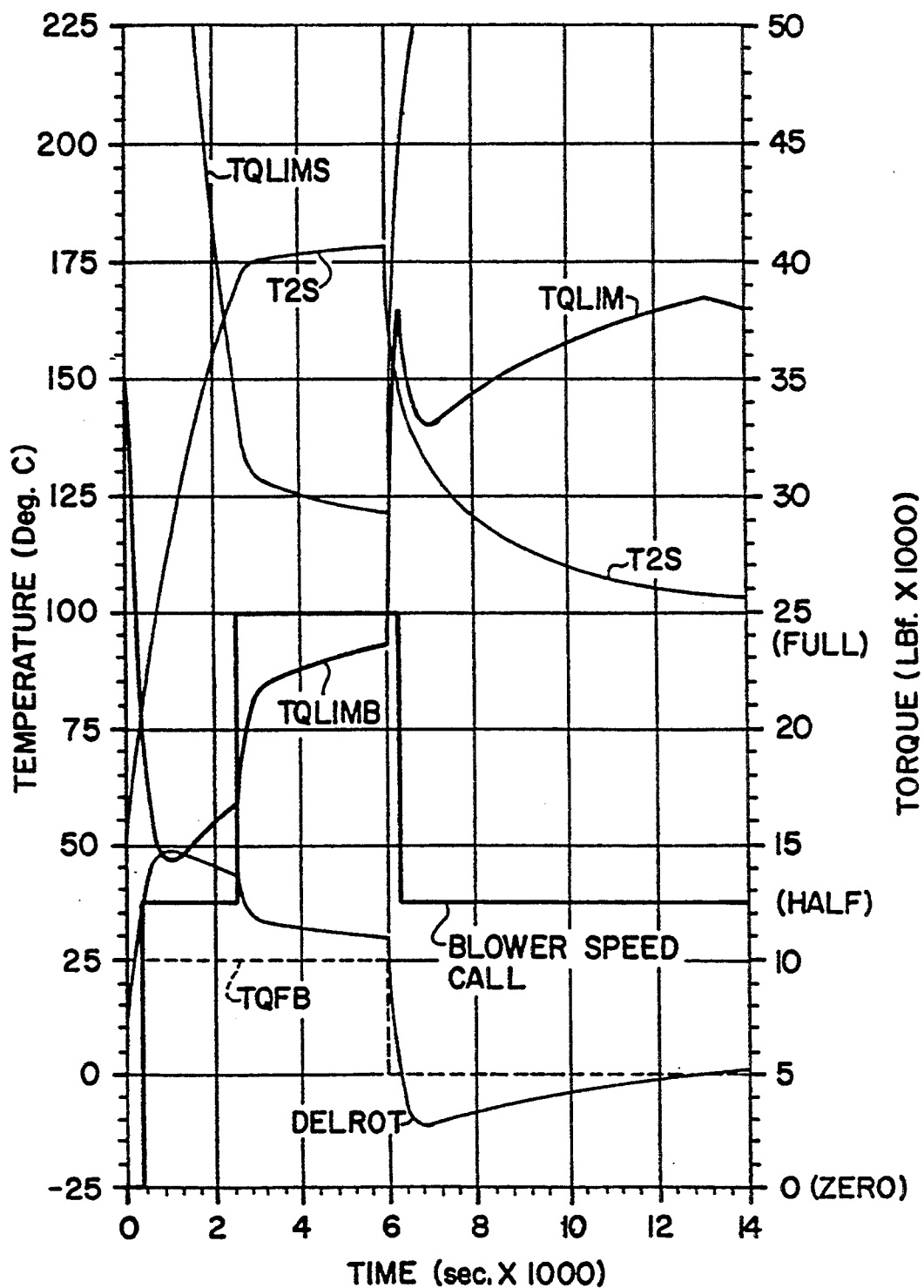
FIGS. 3a-3b are graphs illustrating the expected responses of an AC traction motor to typical overload conditions and the effects of the thermal protection system.
Figure 3B:
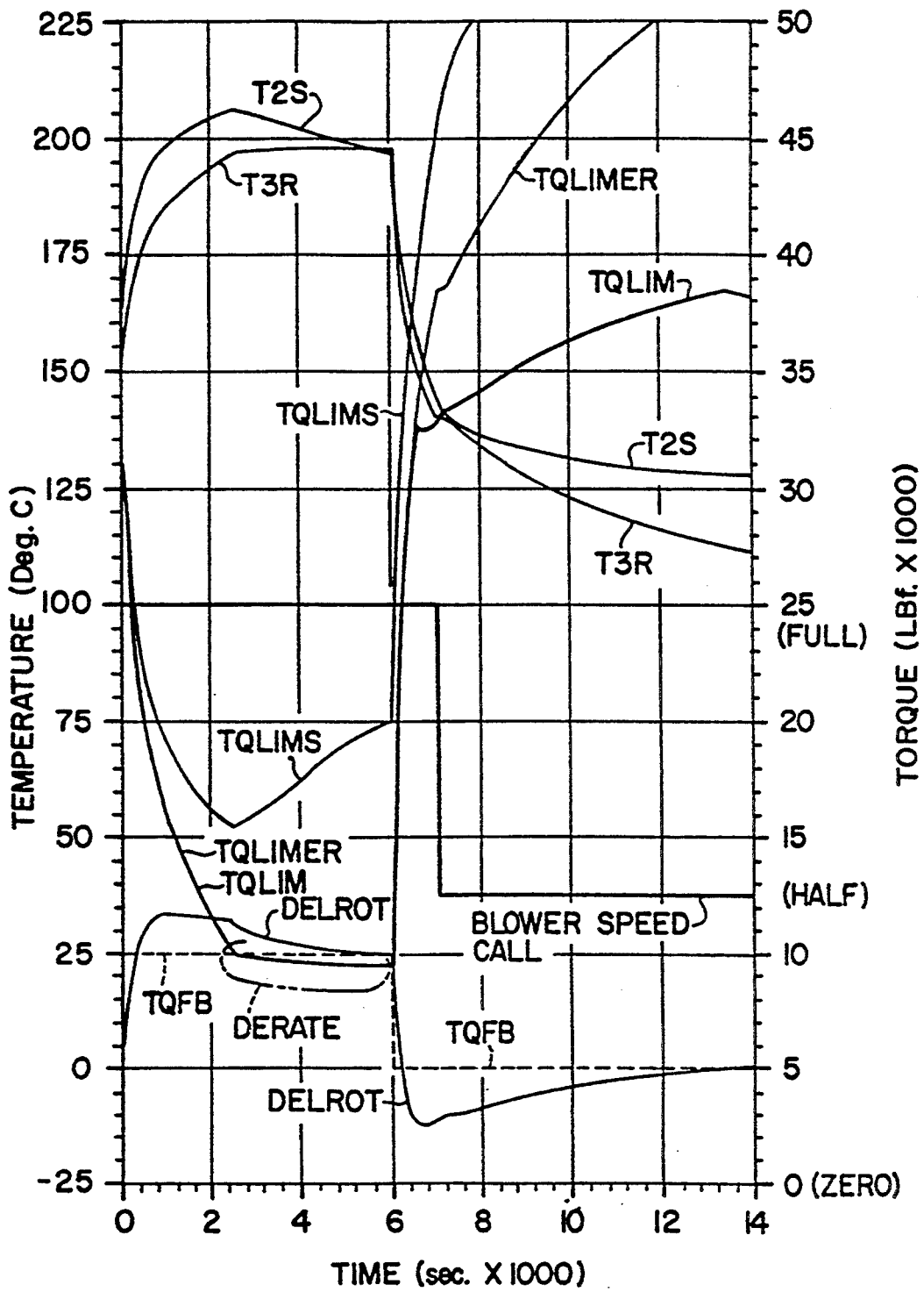

The traction motor torque limit (TQLIM), as calculated by the algorithm, will be an inverse function of the motor temperatures predicted by the algorithm. The relationship is shown in FIGS. 3a–3b.

R1AVE and R2AVE are supplied to the inverter controller for use in the control of the respective traction motor. The inverter controller uses the R1AVE and R2AVE values to adjust the supplied torque, frequency, and voltage of the motor to improve the motor control function accuracy.

Thus, temperature prediction is accomplished within the control system by numerical solution of a set of differential equations which characterize the transient thermal behavior of the motor. Input signals defined previously are used to determine the motor losses at any arbitrary operating condition in time. These losses along with the ambient condition of the ventilating air provide the thermal model with the necessary information required to perform the temperature predictions in near-real time while the vehicle is operating.

In addition to stator winding protection, the control system protects the motor rotor cage form thermal damage in two ways. Rotor cage end ring temperature is limited to guard against a reduction of ring mechanical properties which can occur at high temperatures, and the differential temperature between the rotor cage end ring and the bulk temperature of the rotor core is limited to prevent excessive fatigue damage of the rotor cage bar extensions.

FIGS. 3a-3b are graphs illustrating the response of an AC traction motor to a typical overload condition and the effects of the thermal protection function, with FIG. 3a representing a response for a cold motor start and FIG. 3b representing a response for a hot motor start. The graph of FIG. 3b includes a region wherein the motor is being derated by the protection system.

Torque limits are calculated for each motor subassembly for which protection is required. The worst case subassembly limit is selected as the governing value TQLIM. Higher temperatures result in lower values for the torque limits. The calculated torque limits vary as the overload progresses because the torque limit is continuously calculated during the operation of the invention's protection system. As some point in time the calculated torque limit and the value of torque requested by the vehicle controller can coincide. When this point is reached, the protection system overrides the vehicle torque request and the inverter controller begins to reduce traction motor torque, as shown in FIG. 3b.

Also shown in FIGS. 3a-3b is the status of the traction motor ventilating blower. Blower speed requests (Blower Speed Call) are calculated by the protection system for each protected subassembly within the motor. The limiting case value is selected as the governing value for the motor.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

```
SUB MTP13 (TQFB, VL1, SLPRPM, TAMB, SFBTM, PWM, DIESELSPD, BSPEED, PAMB, IPHPK, IFIRST, RUNINV)

'DATA SUPPLIED TO MTP13

TQFB       :   MOTOR AIR GAP TORQUE (FROM INVERTER CONTROL CALCULATIONS) (lbf-ft)
   VL1        :   DC LINK VOLTAGE (Vdc)
   SLIPRPM    :   ROTOR SLIP SPEED (rpm)
   TAMB       :   AMBIENT TEMPERATURE (deg. C)
   SFBTM      :   TRACTION MOTOR SPEED FEEDBACK (rpm) - Supplied as unsigned (always positive)
   PWM        :   SQ. WAVE / PWM BOOLEAN (PWM=1 implies PWM mode)
   DIESELSPD  :   ENGINE SPEED (rpm)
   BSPEED     :   EQUIPMENT BLOWER SPEED STATUS (0 = STOP, .5 = HALF, 1.0 = FULL)
   PAMB       :   ATMOSPHERIC PRESSURE (psi)
   IPHPK      :   PEAK VALUE OF FUNDAMENTAL PHASE CURRENT (A-peak)
   RUNINV     :   INVERTER STATUS BOOLEAN (RUNINV=1 implies inverter powered up, =0 implies inverter powered down)

'OUTPUT VARIABLES TO LOCOMOTIVE SYSTEM

ATEMPS :   AVERAGE STATOR TEMPERATURE (C)
   ATEMPR :   AVERAGE ROTOR CAGE TEMPERATURE (C)
   EBSPCM :   EQUIPMENT BLOWER SPEED COMMAND (0 = STOP, .5 = HALF, 1.0 = FULL)
   TQLIM  :   MOTOR TORQUE LIMIT (lbf-ft)
   R1AVE  :   STATOR WDG. RESISTANCE/PHASE - (Ohm) @ "ATEMPS" TEMPERATURE
   R2AVE  :   ROTOR CAGE RESISTANCE/PHASE - (Ohm) @ "ATEMPR" TEMPERATURE

'PARAMETERS

AEND   = 2473.03      CPAIR  = 457.86      C2S = 4.1622E+04      GINS  = 8.3944E+02   HTOZER = 120.0      MLC    = 37.74
   AENDR  = 320.01       COREPU = .50         C3S = 1.5719E+04      GINSE = 2.6777E+02   HTOZS  = 90.0       OFFSET = 13.461
   ALPHA  = .00426       CSET1  = .00039      C4S = 8.8255E+04      G12R  = 2.2984E+01   KEDDY  = 1.2527E-05 PIE    = 3.14159
   AROT   = 2532.92      CSET2  = 0.0         C5S = 2.2543E+05      G23R  = 2.2984E+01   KHBAR  = 3.3622     POLES  = 6.0
   AROTX  = .13          CSET3  = .00039      DT  = 6.0             G24R  = 4.7717E+02   KHER   = .3355      RHOB   = .08074
   ASTA   = 4940.06      CSET4  = 0.0         EBCONST = 2.9762      G12S  = 2.2634E+01   KHS    = 6.1804     R10    = .00660
   ASTAX  = .32          CSLL   = 3.9910E-08  ERTHK = 1.10          G23S  = 2.2634E+01   KITQ   = 1.1848E+05 R2BAR  = .0064
   BAREXT = 1.0          C1CFM  = .6710       FREQB = 21.0          G4SS  = 4.2316E+02   KITQB  = 3.8478E+04 R2ER   = .0013
   CER1   = 5.3000E-04   C2CFM  = .2580       FTOHBAR = 40.00       HDIA  = .813         K1TQER = 1.0848E+05 SK     = 2.296
   CER2   = 4.2000E-04   C1R    = 7.0066E+03  FTOHER  = 140.00      HDIAR = .625         K2TQ   = 5.0000E+02 SLLPU  = .50
   CER3   = 0.0          C2R    = 1.2716E+05  FTOHS   = 150.00      HTOFBAR = 50.0       K2TQB  = 5.0000E+02 TINIT  = 40.0
   CER4   = 0.0          C3R    = 7.0066E+03  FWCOEF = .5207        HTOFER  = 150.0      K2TQER = 5.0000E+02 VDROP  = 10
   CL1    = .060         C4R    = 2.5122E+05  GC3   = 1.0149E+03    HTOFS   = 170.0      LCORE  = 21.50      ZTOHBAR = 30.0
   CL2    = .187         C1S    = 1.5719E+04  GCR3  = 7.5839E+02    HTOZBAR = 20.0       LEND   = 8.12       ZTOHER  = 130.0
                                                                                                             ZTOHS   = 110.0

'INITIALIZATION

IPH = IPHPK / SQR(2):      'FUNDAMENTAL PHASE CURRENT - RMS VALUE

IF IFIRST > .5 THEN
      T1SP = TINIT:   'INITIAL CONDITIONS
      T2SP = TINIT
      T3SP = TINIT
      T4SP = TINIT
      T5SP = TINIT
      T6SP = TINIT
      T1RP = TINIT
      T2RP = TINIT
      T3RP = TINIT
      T4RP = TINIT
```

```
5801        T5RP = TINIT
5803        IFIRST = 0
5804    ELSE
5806        T1SP = T1S
5808        T2SP = T2S
5810        T3SP = T3S
5812        T4SP = T4S
5814        T5SP = T5S
5816        T6SP = T6S
5818        T1RP = T1R
5820        T2RP = T2R
5822        T3RP = T3R
5824        T4RP = T4R
5826        T5RP = T5R
5828    END IF

5840 '
5841 'CALCULATE LOSSES
5902 '
5904    IF RUNINV < 1 THEN
5905        CLOSS = 0
5906        W2 = 0
5907        FW = 0
5908        IPH = 0
5909        LLOSS = 0
5910        WNS1 = 0
5911        WNS2 = 0
5912        WNS3 = 0
5913        WNBAR = 0
5914        WNER1 = 0
5915        WNER2 = 0
5916        SFBTM = .1
5917    ELSE
5918        IF SFBTM < .1 THEN SFBTM = .1:       ' AVOID ZERO DIVIDES @ ZERO RPM
5919        RPMS = SLIPRPM + SFBTM
            IF RPMS < 2 THEN RPMS = 2:           ' AVOID ZERO DIVIDE @ ZERO "RPMS"
            SLIP = 1 - SFBTM / RPMS
5920        FREQ = RPMS * POLES / 120:           ' SYNCHRONOUS SPEED - (rpm)
5922 '
5923 '    CALCULATE INVERTER TIME HARMONIC LOSSES
5924 '
5925        IF PWM > 0 THEN
5926            VPH = (FREQ / FREQB) * (VL1 - SGN(TQFB) * VDROP - PIE * OFFSET / SQR(2)) * SQR(2) / PIE + OFFSET
5927            WNS1 = 0.
5928            WNS2 = 0
5929            WNS3 = 0
5930            WNBAR = 0
5931            WNER1 = 0
5932            WNER2 = 0
15933       ELSE
5934            VPH = (VL1 - SGN(TQFB) * VDROP - PIE * OFFSET / SQR(2)) * SQR(2) / PIE + OFFSET
5935            WNS1 = KHS * (VPH / FREQ) ^ 2 * (1 + ALPHA * T1SP) * (LEND / MLC):    ' STA. WDG. HARM. LOSS (W) @ OP TEMP
5936            WNS2 = KHS * (VPH / FREQ) ^ 2 * (1 + ALPHA * T2SP) * (LCORE / MLC):  ' STA. WDG. HARM. LOSS (W) @ OP TEMP
5937            WNS3 = KHS * (VPH / FREQ) ^ 2 * (1 + ALPHA * T3SP) * (LEND / MLC):    ' STA. WDG. HARM. LOSS (W) @ OP TEMP
5938            WNBAR = KHBAR * (VPH / FREQ) ^ 2 * SQR(FREQ) * (1 + ALPHA * T2RP):   ' ROT. BAR HARM. LOSS (W) @ OP TEMP
5939            WNER1 = KHER * (VPH / FREQ) ^ 2 * (1 + ALPHA * T1RP):                ' ROT. END RING HARM. LOSS (INLET END) (W) @ OP TEMP
5940            WNER2 = KHER * (VPH / FREQ) ^ 2 * (1 + ALPHA * T3RP):                ' ROT. END RING HARM. LOSS (DISCHARGE END) (W) @ OP TEMP 5941        END IF
5942 '
5943        W2 = TQFB * RPMS * SLIP / 7.0402:        ' FUND. SECONDARY I^R (W)
5944        FW = FWCOEF * (SFBTM / 1000) ^ 3 * 1000: ' FRICTION + WINDAGE (W)
5945        EF = 1 + KEDDY * FREQ ^ 2:               ' STATOR SLOT EDDY FACTOR (AVE. FOR SLOT)
5946        CLOSS = CL1 * (VPH / FREQ) ^ 2 * FREQ ^ 1.5 + CL2 * SFBTM * (VPH / FREQ) ^ 1.5:  ' NO-LOAD CORE LOSS (W)
5947        LLOSS = CSLL * TQFB ^ 2 * FREQ ^ SK:     ' STRAY LOAD LOSS - (W)
5948    END IF
5949 '
5950    W01S = (3 * IPH ^ 2 * R10) * (LEND / MLC):          ' COIL DC LOSS - INLET END (W) @ ZERO DEG. C
5952    W02S = (3 * IPH ^ 2 * R10) * EF * (LCORE / MLC):    ' COIL DC LOSS - CORE @ ZERO DEG. C
5954    W03S = W01S:                                        ' COIL LOSS DISCHARGE END (W) @ ZERO DEG. C
5956    W4S = ((1 - COREPU) * CLOSS + LLOSS * SLLPU):       ' LOSS IN STA. TEETH (W)
5958    W5S = CLOSS * COREPU:                               ' CORE LOSS IN STA. YOKE (W)
5960 '
5962    W1R = W2 * (R2ER / (R2ER + R2BAR)) / 2:    ' FUND. END RING LOSS @ OPERATING TEMP - (INLET END)
5964    W2R = W2 * (R2BAR / (R2ER + R2BAR)) + (1 - SLLPU) * LLOSS: ' FUND. BAR LOSS @ OPERATING TEMP
5966    W3R = W1R:                                 ' FUND. END RING LOSS @ OPERATING TEMP - (DISCHARGE END)
5970 '
5972    WTOT1 = FW + CLOSS + LLOSS + W2 + W01S * (1 + ALPHA * T1SP) + W02S * (1 + ALPHA * T2SP) + W03S * (1 + ALPHA * T3SP):  ' TOTAL FUND. LOSS (W) @ OPERATING TEMP
5974    WTOTN = WNS1 + WNS2 + WNS3 + WNBAR + WNER1 + WNER2:    ' TOTAL HARMONIC LOSS (W)
5976    WTOT = WTOT1 + WTOTN
5980 '
5981 'CALCULATE AIR FLOW, HEAT X-FER COEFFICIENTS & THERMAL CONDUCTANCES
5982 '
5984    SFBEB = EBCONST * DIESELSPD * BSPEED:     ' EQUIP. BLWR SPEED (rpm)
5986    IF SFBEB < .1 THEN SFBEB = .1
6002    CFMSTA = C1CFM * SFBEB:                   ' VOLUMETRIC FLOW RATE - STA. (ft^3/min.)
6003    CFMROT = C2CFM * SFBEB:                   ' VOLUMETRIC FLOW RATE - ROT. (ft^3/min.)
6004    DENAIRS = RHOB * (PAMB / 14.69) * (273 / (273 + T6SP)): ' AIR DENSITY (LB/FT^3) - STA. CORE
6005    DENAIRR = RHOB * (PAMB / 14.69) * (273 / (273 + T5RP)): ' AIR DENSITY (LB/FT^3) - ROT. CORE
6006    MDOTS = CFMSTA * DENAIRS / 60:            ' MASS FLOW RATE - STA. (LBm/SEC)
6008    MDOTR = CFMROT * DENAIRR / 60:            ' MASS FLOW RATE - ROT. (LBm/SEC)
6009    MDOT = MDOTS + MDOTR:                     ' MASS FLOW RATE - TOTAL (LBm/SEC)
6010 '
6012    HEND1 = CSET1 * SFBTM ^ .8 + CSET2 * MDOT: ' HEAT TRANSFER COEFF. - INLET END COILS (W/IN^2-C))
6013    HEND2 = CSET3 * SFBTM ^ .8 + CSET4 * MDOT: ' HEAT TRANSFER COEFF. - DISCHARGE END COILS (W/IN^2-C))
6014    HEND1R = CER1 * SFBTM ^ .8 + CER3 * MDOTR: ' HEAT X-FER COEFF. - ROT. END RING (INLET END) (W/IN^2-C))
6015    HEND2R = CER2 * SFBTM ^ .8 + CER4 * MDOTR: ' HEAT X-FER COEFF. - ROT. END RING (DISCHARGE END) (W/IN^2-C))
6016 '
6017    VSTA = CFMSTA / ASTAX:                    ' STA. DUCT VELOCITY (FT/MIN)
6020    RESTA = DENAIRS * VSTA * HDIA / (720 * .0000134): ' STA. DUCT REYNOLD'S NO. (MU @ 60C)
6022    HSTA = (1.374 / 100000!) * RESTA ^ .8 / HDIA:     ' STA. VENT DUCT HEAT TRAN. COEFF. (w/(deg C*in^2)
6025    VROT = CFMROT / AROTX:                    ' ROT. VENT DUCT VELOCITY (FT/MIN)
6026    REROT = DENAIRR * VROT * HDIAR / (720 * .0000134): ' ROT. VENT DUCT REYNOLD'S NO.
6028    HROT = (1.374 / 100000) * REROT ^ .8 / HDIAR:     ' ROT. VENT DUCT HEAT TRANSFER COEFF. (w/(deg C*in^2)
6090 '
```

```
6105    G1S = 1 / (1 / (HEND1 * AEND) + 1 / GINSE):        ' THERMAL CONDUCTANCE - STA. COIL END (INLET END)
6110    G3S = 1 / (1 / (HEND2 * AEND) + 1 / GINSE):        ' THERMAL CONDUCTANCE - STA. COIL END (DISCHARGE END)
6120    G1R = HEND1R * AENDR:                              ' THERMAL SURF. CONDUCTANCE - ROT CAGE END (INLET END)
6125    G3R = HEND2R * AENDR:                              ' THERMAL SURF. CONDUCTANCE - ROT CAGE END (DISCHARGE END)
6115    G56S = 1 / (1 / GC3 + 1 / (HSTA * ASTA))
6128    G45R = 1 / (1 / GCR3 + 1 / (HROT * AROT))
6130 '
6135    GAIRS = MDOTS * CPAIR:                             ' (LB/SEC)*SPECIFIC HEAT - STA. CORE AIR RISE CONDUCTANCE
6140    GAIRR = MDOTR * CPAIR:                             ' (LB/SEC)*SPICIFIC HEAT - ROT. CORE AIR RISE CONDUCTANCE
6142    GAIR = MDOT * CPAIR
6150 '
6551 ' CALCULATE TEMPERATURES
6552 '
6586    TEND1 = (T1RP * G1R + T1SP * G1S + TAMB * GAIR + FW / 2) / (G1R + G1S + GAIR)
6587    IF BSPEED < .5 THEN
6588       TEND2 = TEND1:                                  ' PREVENT OVERFLOW IN TEND2 CALC. IF BSPEED = 0
6589    ELSE
6590       TEND2 = WTOT / GAIR + TAMB
6592    END IF
6595 '
6595    T1S = (W01S * (1 + ALPHA * T1SP) + WNS1 - (G1S + G12S) * T1SP + G12S * T2SP + G1S * TEND1 + C1S * T1SP / DT) * DT / C1S
6600    T2S = (W02S * (1 + ALPHA * T2SP) + WNS2 + G12S * T1SP - (G23S + G12S + GINS) * T2SP + G23S * T3SP + GINS * T4SP + C2S * T2SP / DT) * DT / C2S
6610    T3S = (W03S * (1 + ALPHA * T3SP) + WNS3 + G23S * T2SP - (G3S + G23S) * T3SP + G3S * TEND2 + C3S * T3SP / DT) * DT / C3S
6620    T4S = (W4S + GINS * T2SP - (GINS + G45S) * T4SP + G45S * T5SP + C4S * T4SP / DT) * DT / C4S
6630    T5S = (W5S + G45S * T4SP - (G56S + G45S) * T5SP + G56S * T6SP + C5S * T5SP / DT) * DT / C5S
6640    T6S = (T5SP * G56S + 2 * GAIRS * TEND1) / (G56S + 2 * GAIRS)
6650 '
6660    T1R = (W1R + WNER1 - (G1R + G12R) * T1RP + G12R * T2RP + G1R * TEND1 + C1R * T1RP / DT) * DT / C1R
6670    T2R = (W2R + WNBAR - (G23R + G12R + G24R) * T2RP + G12R * T1RP + G23R * T3RP + G24R * T4RP + C2R * T2RP / DT) * DT / C2R
6680    T3R = (W3R + WNER2 - (G3R + G23R) * T3RP + G23R * T2RP + G3R * TEND2 + C3R * T3RP / DT) * DT / C3R
6690    T4R = (G24R * T2RP - (G24R + G4R) * T4RP + G4R * T5RP + C4R * T4RP / DT) * DT / C4R
6700    T5R = (G45R * T4RP + 2 * GAIRR * TEND1) / (G45R + 2 * GAIRR)
6710    ATEMPS = (T1S * LEND + T2S * LCORE + T3S * LEND) / MLC:                                 ' AVE. TEMP - STA.
6712    ATEMPR = (T1R * (ERTHK + BAREXT) + T2R * LCORE + T3R * (ERTHK + BAREXT)) / (LCORE + 2 * BAREXT + 2 * ERTHK):   ' AVE. TEMP - ROT.
6714    DELROT = T3R - T4R:       ' DIFFERENTIAL TEMP. BETWEEN ROTOR END RING (DISCHARGE-END) AND ROTOR CORE
        R1AVE = (1 + ALPHA * ATEMPS) * R10:                ' AVE STA. RESISTANCE/PHASE - (Ohm)
        R2AVE = (1 + ALPHA * ATEMPR) * (R2BAR + R2ER) * (234.5 / (234.5 + 110)):   ' AVE. ROT. CAGE RESISTANCE/PHASE - (Ohm)

' DETERMINE BLOWER SPEED

IF BSPEED < .5 THEN
       IF T2S > HTOFS THEN
          REQBSPDS = 1!
       ELSEIF T2S > ZTOHS THEN
          REQBSPDS = .5
          ELSE REQBSPDS = 0
       END IF
    ELSEIF BSPEED < 1 AND BSPEED > 0 THEN
       IF T2S > HTOFS THEN
          REQBSPDS = 1!
       ELSEIF T2S < HTOZS THEN
          REQBSPDS = 0
          ELSE REQBSPDS = .5
       END IF
    ELSEIF BSPEED > .5 THEN
       IF T2S < HTOZS THEN
          REQBSPDS = 0
       ELSEIF T2S < FTOHS THEN
          REQBSPDS = .5
          ELSE REQBSPDS = 1!
       END IF
    END IF

' STATOR WDG. BLOWER SPEED

' ROTOR END RING BLOWER SPEED

IF BSPEED < .5 THEN
       IF T3R > HTOFER THEN
          REQBSPDER = 1!
       ELSEIF T3R > ZTOHER THEN
          REQBSPDER = .5
          ELSE REQBSPDER = 0
       END IF
    ELSEIF BSPEED < 1 AND BSPEED > 0 THEN
       IF T3R > HTOFER THEN
          REQBSPDER = 1!
       ELSEIF T3R < HTOZER THEN
          REQBSPDER = 0
          ELSE REQBSPDER = .5
       END IF
    ELSEIF BSPEED > .5 THEN
       IF T3R < HTOZER THEN
          REQBSPDER = 0
       ELSEIF T3R < FTOHER THEN
          REQBSPDER = .5
          ELSE REQBSPDER = 1!
       END IF
    END IF

' ROTOR BAR STRESS BLOWER SPEED

IF BSPEED < .5 THEN
       IF ABS(DELROT) > HTOFBAR THEN
          REQBSPDBAR = 1!
       ELSEIF ABS(DELROT) > ZTOHBAR THEN
          REQBSPDBAR = .5
          ELSE REQBSPDBAR = 0
       END IF
    ELSEIF BSPEED < 1 AND BSPEED > 0 THEN
       IF ABS(DELROT) > HTOFBAR THEN
          REQBSPDBAR = 1!
       ELSEIF ABS(DELROT) < HTOZBAR THEN
          REQBSPDBAR = 0
          ELSE REQBSPDBAR = .5
       END IF
```

```
        ELSEIF BSPEED > .5 THEN
            IF ABS(DELROT) < HTOZBAR THEN
                REQBSPDBAR = 0
            ELSEIF ABS(DELROT) < FTOHBAR THEN
                REQBSPDBAR = .5
                ELSE REQBSPDBAR = 1!
            END IF
        END IF

' DETERMINE LIMITING CASE BLOWER SPEED

IF REQBSPDS >= REQBSPDER AND REQBSPDS >= REQBSPDBAR THEN
            EBSPCM = REQBSPDS
        ELSEIF REQBSPDER >= REQBSPDS AND REQBSPDER >= REQBSPDBAR THEN
            EBSPCM = REQBSPDER
        ELSEIF REQBSPDBAR >= REQBSPDS AND REQBSPDBAR >= REQBSPDER THEN
            EBSPCM = REQBSPDBAR
        END IF

' CALCULATE TORQUE LIMITS & DERATION

TQLIMS = SGN(TQFB) * (K1TQ - K2TQ * T2S):           ' TORQUE LIMIT IMPOSED BY STA. COPPER TEMP.
        TQLIMER = SGN(TQFB) * (K1TQER - K2TQER * T3R):      ' TORQUE LIMIT IMPOSED BY ROT. END RING TEMP.
        TQLIMB = SGN(TQFB) * (K1TQB - K2TQB * ABS(DELROT)): ' TORQUE LIMIT IMPOSED BY ROT. BAR EXT. STRESS

IF ABS(TQLIMS) <= ABS(TQLIMER) AND ABS(TQLIMS) <= ABS(TQLIMB) THEN
            TQLIM = TQLIMS
        ELSEIF ABS(TQLIMER) <= ABS(TQLIMS) AND ABS(TQLIMER) <= ABS(TQLIMB) THEN
            TQLIM = TQLIMER
        ELSEIF ABS(TQLIMB) <= ABS(TQLIMS) AND ABS(TQLIMB) <= ABS(TQLIMER) THEN
            TQLIM = TQLIMB
        END IF
```

' AEND      : SURF. AREA OF STATOR COIL END TURNS (in^2)

' AENDR     : SURF. AREA OF ROTOR CAGE END - (in^2)

' ALPHA     : 1 / 234.5 (reciprocal of the inferred absolute zero for stator copper)

' AROT      : TOTAL ROT. DUCT SURFACE AREA FOR HEAT X-FER - (in^2)

' AROTX     : TOT. ROT. DUCT X-SECT PER MACHINE - (ft^2)

' ASTA      : TOTAL STA. DUCT SURFACE AREA FOR HEAT X-FER - (in^2)

' ASTAX     : TOT. STA. DUCT X-SECT (ft^2)

' BAREXT    : ROTOR BAR EXTENSION (ONE END) - (in.)

' CER1      : ROTOR END AREA HEAT X-FER FACTOR (INLET END) - ROTOR SPEED COMPONENT

' CER2      : ROTOR END AREA HEAT X-FER FACTOR (DISCHARGE END) - ROTOR SPEED COMPONENT

' CER3      : ROTOR END AREA HEAT X-FER FACTOR (INLET END) - CORE AIR FLOW COMPONENT - ([W/in^2-C]/[lbm/sec])

' CER4      : ROTOR END AREA HEAT X-FER FACTOR (DISCHARGE END) - CORE AIR FLOW COMPONENT ([W/in^2C]/[lbm/sec])

' CL1       : CORE LOSS COEFF. - FUND. FREQ. LOSS

' CL1       : CORE LOSS COEFF. - PULSATION LOSS

' CPAIR     : SPECIFIC HEAT OF AIR - (W-sec)/(lbm-C)

' COREPU    : (STA YOKE CORE LOSS)/(TOTAL CORE LOSS)

' CSET1     : STA. END TURN HEAT X-FER FACTOR (ROTOR SPEED COMPONENT) - INLET END

' CSET2     : STA. END TURN HEAT X-FER FACTOR (THRU-AIR FLOW COMPONENT) - INLET END - ([W/in^2-C]/[lbm/sec])

' CSET3     : STA. END TURN HEAT X-FER FACTOR (ROTOR SPEED COMPONENT) - DISCHARGE END

' CSET4     : STA. END TURN HEAT X-FER FACTOR (THRU-AIR FLOW COMPONENT) - DISCHARGE END - ([W/in^2-C]/[lbm/sec])

' CSLL      : SLL COEFF.

' C1CFM     : STATOR CORE CFM FRACTION - (stacfm/EBrpm)

' C2CFM     : ROTOR CORE CFM FRACTION - (rotcfm/EBrpm)

' C1R       : HEAT CAPACITY - ROTOR END RING (INLET END) - (W-sec/C)

' C2R       : HEAT CAPACITY - ROTOR BARS - (W-sec/C)

' C3R       : HEAT CAPACITY - ROTOR END RING (DISCHARGE END) - (W-sec/C)

' C4R       : HEAT CAPACITY - ROTOR CORE - (W-sec/C)

' C1S       : HEAT CAPACITY - STATOR COIL END TURNS (INLET END) - (W-sec/C)

' C2S       : HEAT CAPACITY - STATOR COIL SLOT PORTION - (W-sec/C)

| | |
|---|---|
| *C3S | : HEAT CAPACITY - STATOR COIL END TURNS (DISCHARGE END) - (W-sec/C) |
| *C4S | : HEAT CAPACITY - STATOR TEETH - (W-sec/C) |
| *C5S | : HEAT CAPACITY - STATOR YOKE - (W-sec/C) |
| *DT | : INTEGRATION INTERVAL - (sec) |
| *EBCONST | : EQUIPMENT BLOWER CONSTANT - (EBrpm/DIESELrpm) |
| *ERTHK | : AXIAL THICKNESS OF ROTOR CAGE END RING - (in.) |
| *FREQB | : FREQUENCY @ PWM CORNER POINT - (Hz) |
| *FTOHBAR | : ROT. END RING/CORE DIFFERENTIAL TEMP. BLOWER TRANSISTION TEMP. - FULL TO 1/2 SPEED (C) |
| *FTOHER | : ROT. END RING BLOWER TRANSISTION TEMP. - FULL TO 1/2 SPEED (C) |
| *FTOHS | : STA. WDG. BLOWER TRANSISTION TEMP. - FULL TO 1/2 SPEED (C) |
| *FWCOEF | : F&W COEFFICIENT (FORT WAYNE FORMULA) |
| *GC3 | : THERMAL CONDUCTANCE - STATOR CORE - (W/C) |
| *GCR3 | : THERMAL CONDUCTANCE - ROTOR CORE - (W/C) |
| *GINS | : THERMAL CONDUCTANCE - STATOR SLOT COIL INSULATION - (W/C) |
| *GINSE | : THERMAL CONDUCTANCE - STATOR COIL END TURN INSULATION - (W/C) |
| *G12R | : THERMAL CONDUCTANCE BETWEEN NODE 1 & 2 - ROTOR BAR - (W/C) |
| *G23R | : THERMAL CONDUCTANCE BETWEEN NODE 2 & 3 - ROTOR CORE - (W/C) |
| *G24R | : THERMAL CONDUCTANCE BETWEEN NODE 2 & 4 - ROTOR CORE - (W/C) |
| *G12S | : THERMAL CONDUCTANCE BETWEEN NODE 1 & 2 - STATOR COIL - (W/C) |
| *G23S | : THERMAL CONDUCTANCE BETWEEN NODE 2 & 3 - STATOR CORE - (W/C) |
| *G45S | : THERMAL CONDUCTANCE BETWEEN NODE 4 & 5 - STATOR CORE - (W/C) |
| *HDIA | : HYDRAULIC DIAMETER OF STATOR VENT DUCT - (in.) |
| *HDIAR | : HYDRAULIC DIAMETER OF ROTOR VENT DUCT - (in.) |
| *HTOFBAR | : ROT. END RING/CORE DIFFERENTIAL TEMP. BLOWER TRANSISTION TEMP. - 1/2 TO FULL SPEED (C) |
| *HTOFER | : ROT. END RING BLOWER TRANSISTION TEMP. - 1/2 TO FULL SPEED (C) |
| *HTOFS | : STA. WDG. BLOWER TRANSISTION TEMP. - 1/2 TO FULL SPEED (C) |
| *HTOZBAR | : ROT. END RING/CORE DIFFERENTIAL TEMP. BLOWER TRANSISTION TEMP. - 1/2 TO ZERO SPEED (C) |
| *HTOZER | : ROT. END RING BLOWER TRANSISTION TEMP. - 1/2 TO ZERO SPEED (C) |
| *HTOZS | : STA. WDG. BLOWER TRANSISTION TEMP. - 1/2 TO ZERO SPEED (C) |
| *KEDDY | : CONSTANT USED IN STATOR SLOT EDDY FACTOR CALCULATION |
| *KHBAR | : ROT. BAR TIME HARMONIC LOSS COEFF. - DEFINED AT ZERO C |
| *KHER | : ROT. CAGE END RING TIME HARMONIC LOSS COEFF. (PER END RING) - DEFINED AT ZERO C |
| *KHS | : STA. WDG. TIME HARMONIC LOSS COEFF. - DEFINED AT ZERO C |
| *K1TQ | : STA. WDG. DERATING FACTOR (220C IS S.S. LIMIT) - (lbf-ft) |
| *K1TQB | : ROT. BAR EXT. STRESS DERATING FACTOR (50C IS S.S. LIMIT) - (lbf-ft) |
| *K1TQER | : ROT. END RING DERATING FACTOR (200C IS S.S. LIMIT) - (lbf-ft) |
| *K2TQ | : STA. WDG. DERATING FACTOR - (lbf-ft/C) |
| *K2TQB | : ROT. BAR EXT. STRESS DERATING FACTOR - (lbf-ft/C) |
| *K2TQER | : ROT. END RING DERATING FACTOR - (lbf-ft/C) |
| *LCORE | : CORE LENGTH - (in.) |
| *LEND | : AXIAL LENGTH OF COIL END TURN/END - (in.) |
| *MLC | : MEAN LENGTH OF COIL - (in.) |

| | |
|---|---|
| *OFFSET | : INVERTER VOLTAGE OFF-SET @ ZERO SPEED - (Vph-rms) |
| *PIE | : 3.14159 |
| *POLES | : NUMBER OF MOTOR POLES |
| *RHO8 | : DENSITY OF AIR @ SEA LEVEL & ZERO C - (lbm/ft*3) |
| *R10 | : STATOR WDG. RESISTANCE/PHASE @ ZERO C - (Ohm) |
| *R2BAR | : ROTOR CAGE RESISTANCE @ 110 C - BAR CONTRIBUTION ONLY - (Ohm) |
| *R2ER | : ROTOR CAGE RESISTANCE @ 110 C - END RING CONTRIBUTION ONLY - (Ohm) |
| *SK | : SLL FREQ. EXPONENT |
| *SLLPU | : (STA TEETH SLL)/(TOTAL SLL) |
| *TINIT | : INITIAL TEMPERATURE (C) |
| *VDROP | : INVERTER VOLTAGE DROP (Vdc) |
| *ZTOHBAR | : ROT. END RING/CORE DIFFERENTIAL TEMP. BLOWER TRANSISTION TEMP. - ZERO TO 1/2 SPEED (C) |
| *ZTOHER | : ROT. END RING BLOWER TRANSISTION TEMP. - ZERO TO 1/2 SPEED (C) |
| *ZTOHS | : STA. WDG. BLOWER TRANSISTION TEMP. - ZERO TO 1/2 SPEED (C) |

DICTIONARY - OUTPUT VARIABLES TO LOCOMOTIVE CONTROL SOFTWARE

| | |
|---|---|
| *ATEMPR | : AVERAGE ROTOR CAGE TEMPERATURE (C) |
| *ATEMPS | : AVERAGE STATOR TEMPERATURE (C) |
| *EBSPCM | : EQUIPMENT BLOWER SPEED COMMAND (0 = STOP, .5 = HALF, 1.0 = FULL) |
| *R1AVE | : STATOR WDG. RESISTANCE/PHASE - (Ohm) @ "ATEMPS" TEMPERATURE |
| *R2AVE | : ROTOR CAGE RESISTANCE/PHASE - (Ohm) @ "ATEMPR" TEMPERATURE |
| *TQLIM | : MOTOR TORQUE LIMIT - LIMITING CASE - (lbf-ft) |

DICTIONARY - OUTPUT VARIABLES FOR DIAGNOSTIC PURPOSES

| | |
|---|---|
| *REQBSPDBAR | : EQUIPMENT BLOWER SPEED REQUEST - ROT. CAGE BAR EXT. STRESS - (0 = STOP, .5 = HALF, 1.0 = FULL) |
| *REQBSPDER | : EQUIPMENT BLOWER SPEED REQUEST - ROT. CAGE END RING (DISCHARGE END) - (0 = STOP, .5 = HALF, 1.0 = FULL) |
| *REQBSPDS | : EQUIPMENT BLOWER SPEED REQUEST - STA. COIL (CORE PORTION) - (0 = STOP, .5 = HALF, 1.0 = FULL) |
| *TQLIMB | : MOTOR TORQUE LIMIT - ROT. CAGE BAR EXT. STRESS - (lbf-ft) |
| *TQLIMER | : MOTOR TORQUE LIMIT - ROT. CAGE END RING (DISCHARGE END) - (lbf-ft) |
| *TQLIMS | : MOTOR TORQUE LIMIT - STA. COIL (CORE PORTION) - (lbf-ft) |
| DELROT | : DIFFERENTIAL TEMP. (ROT. END RING - ROT. CORE) - (deg. C) |
| *T2S | : STA. COIL TEMP. (CORE PORTION) - (deg. C) |
| *T3R | : ROT. END RING TEMP. (DISCHARGE END) - (deg. C) |
| *SLIP | : ROTOR SLIP - (Per Unit) |

What is claimed is:

1. A thermal protection apparatus for an AC traction motor including a stator, a rotor, and an inverter, comprising:
   means for measuring ambient air temperature of the motor;
   means for measuring atmospheric air pressure of the motor;
   means for using the measured ambient air temperature and atmospheric air pressure values for estimating a plurality of temperatures in the AC traction motor;
   means for calculating a plurality of motor torque limits imposed by the plurality of estimated temperatures; and
   means for controlling the inverter by providing a signal comprising the lowest of the calculated plurality of motor torque limits to an inverter controller.

2. The thermal protection apparatus of claim 1, wherein the means for estimating the plurality of temperatures includes means for estimating a plurality of temperatures in the stator, a plurality of temperatures in the rotor, a rotor endring temperature at an inlet end, and a rotor endring temperature at a discharge end.

3. The thermal protection apparatus of claim 2, wherein the means for calculating the plurality of motor torque limits comprises means for calculating a stator motor torque limit imposed by a predetermined one of the plurality of estimated stator temperatures, calculating an endring motor torque limit imposed by the estimated rotor endring temperature at the discharge end, and calculating a differential temperature motor torque limit imposed by the temperature differential between the estimated rotor endring temperature at the discharge end and a predetermined one of the estimated rotor temperatures.

4. A method of controlling an inverter to provide thermal protection for an AC traction motor including a rotor and a stator comprising the steps of:
starting the inverter;
measuring ambient air temperature of the motor;
measuring atmospheric air pressure of the motor;
estimating a plurality of temperatures in the AC traction motor with the ambient air temperature and atmospheric air pressure values;
calculating a plurality of motor torque limits imposed by the plurality of estimated temperatures; and
controlling the inverter by providing a signal comprising the lowest of the calculated plurality of motor torque limits to an inverter controller.

5. The method of claim 4, wherein the step of estimating the plurality of temperatures includes estimating a plurality of temperatures in the stator, a plurality of temperatures in the rotor, a rotor endring temperature at an inlet end, and a rotor endring temperature at a discharge end.

6. The method of claim 5, wherein the step of calculating the plurality of motor torque limits comprises calculating a stator motor torque limit imposed by a predetermined one of the plurality of estimated stator temperatures, calculating an endring motor torque limit imposed by the estimated rotor endring temperature at the discharge end, and calculating a differential temperature motor torque limit imposed by the temperature differential between the estimated rotor endring temperature at the discharge end and a predetermined one of the estimated rotor temperatures.

7. The method of claim 6, wherein the step of calculating the stator motor torque limit comprises subtracting from a constant related to the maximum permissible stator temperature a constant related to the desired time rate of change of motor torque multiplied by the estimated stator temperature;
the step of calculating the endring motor torque limit comprises subtracting from a constant related to the maximum permissible rotor endring temperature a constant related to the desired time rate of change of motor torque multiplied by the estimated rotor endring temperature; and
the step of calculating the differential temperature motor torque limit comprises subtracting from a constant related to the maximum permissible differential temperature a constant related to the desired time rate of change of motor torque multiplied by the estimated differential temperature.

8. A thermal protection apparatus for an AC traction motor including a stator, a rotor, and a ventilating blower, comprising:
means for measuring ambient air temperature of the motor;
means for measuring atmospheric air pressure of the motor;
means for using the measured ambient air temperature and atmospheric air pressure values for estimating a plurality of temperatures in the AC traction motor;
means for calculating a plurality of blower speed requirements imposed by the plurality of estimated temperatures; and
means for setting the blower speed of the motor ventilating blower to the highest of the calculated plurality of blower speed requirements.

9. The thermal protection apparatus of claim 8, wherein the means for estimating the plurality of temperatures includes means for estimating a plurality of temperatures in the stator, a plurality of temperatures in the rotor, a rotor endring temperature at an inlet end, and a rotor endring temperature at a discharge end.

10. The thermal protection apparatus of claim 9, wherein the means for calculating the plurality of blower speed requirements comprises means for calculating a stator blower speed requirement imposed by a predetermined one of the plurality of estimated stator temperatures, calculating an endring blower speed requirement imposed by the estimated rotor endring temperature at the discharge end, and calculating a differential rotor temperature blower speed requirement imposed by the temperature differential between the estimated rotor endring temperature at the discharge end and a predetermined one of the estimated rotor temperatures.

11. A method of controlling a speed of a blower fan to provide thermal protection for an AC traction motor including a rotor and a stator comprising the steps of:
starting the inverter;
measuring ambient air temperature of the motor;
measuring atmospheric air pressure of the motor;
estimating a plurality of temperatures in the AC traction motor with the ambient temperature and atmospheric air pressure values;
calculating a plurality of blower speed requirements imposed by the plurality of estimated temperatures; and
setting the blower speed of the motor to the highest of the calculated plurality of blower speed requirements.

12. The method of claim 11, wherein the step of estimating the plurality of temperatures includes estimating a plurality of temperatures in the stator, a plurality of temperatures in the rotor, a rotor endring temperature at an inlet end, and a rotor endring temperature at a discharge end.

13. The method of claim 12, wherein the step of calculating the plurality of blower speed requirements comprises calculating a stator blower speed requirement imposed by a predetermined one of the plurality of estimated stator temperatures, calculating an endring blower speed requirement imposed by the estimated rotor endring temperature at the discharge end, and calculating a differential rotor temperature blower speed requirement imposed by the temperature differential between the estimated rotor endring temperature at the discharge end and a predetermined one of the estimated rotor temperatures.

* * * * *